(12) United States Patent
Satoh

(10) Patent No.: US 12,399,700 B2
(45) Date of Patent: Aug. 26, 2025

(54) INFORMATION PROCESSING APPARATUS, INFORMATION PROCESSING METHOD, AND INFORMATION PROCESSING SYSTEM TO ENABLE UPDATE OF A SOFTWARE

(71) Applicant: SONY GROUP CORPORATION, Tokyo (JP)

(72) Inventor: Ryuta Satoh, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 13 days.

(21) Appl. No.: 18/003,268

(22) PCT Filed: Jun. 21, 2021

(86) PCT No.: PCT/JP2021/023309
§ 371 (c)(1),
(2) Date: Dec. 23, 2022

(87) PCT Pub. No.: WO2022/004447
PCT Pub. Date: Jan. 6, 2022

(65) Prior Publication Data
US 2023/0315425 A1 Oct. 5, 2023

(30) Foreign Application Priority Data
Jul. 3, 2020 (JP) ................................ 2020-115428

(51) Int. Cl.
*G06F 8/65* (2018.01)
*B60W 60/00* (2020.01)
(Continued)

(52) U.S. Cl.
CPC ............. *G06F 8/65* (2013.01); *B60W 60/001* (2020.02); *G06T 7/70* (2017.01)

(58) Field of Classification Search
CPC ........ G06F 8/65; G06F 8/656; B60W 60/001; G06T 7/70; G06N 20/00
See application file for complete search history.

(56) References Cited

U.S. PATENT DOCUMENTS 11,555,704 B2\* 1/2023 Servos ................. G01C 21/206
2017/0134164 A1\* 5/2017 Haga ..................... G06F 21/445
(Continued)

FOREIGN PATENT DOCUMENTS

JP 2011-081604 A 4/2011
JP 2019152948 A 9/2019

OTHER PUBLICATIONS

International Search Report and Written Opinion of PCT Application No. PCT/JP2021/023309, issued on Aug. 24, 2021, 11 pages of ISRWO.

*Primary Examiner* — Daxin Wu
(74) *Attorney, Agent, or Firm* — CHIP LAW GROUP

(57) ABSTRACT

The present disclosure relates to an information processing apparatus, an information processing method, an information processing system, and a program that enable update of an SW to be quickly and safely implemented. When the software program (SW) is updated, the SW is updated at a timing at which the SW does not operate in a plurality of processing units constituting the SW, so that the SW is updated without stopping the entire operation of the SW. The present disclosure can be applied to an automated driving technology.

20 Claims, 20 Drawing Sheets

(51) Int. Cl.
*G06F 8/656* (2018.01)
*G06T 7/70* (2017.01)

(56) References Cited

U.S. PATENT DOCUMENTS

| | | | |
|---|---|---|---|
| 2018/0084137 A1* | 3/2018 | Miyazaki | H04N 23/80 |
| 2019/0184916 A1* | 6/2019 | Troia | H04W 4/44 |
| 2019/0283761 A1* | 9/2019 | Bielby | G06F 8/65 |
| 2019/0324458 A1* | 10/2019 | Sadeghi | G05D 1/0276 |
| 2020/0160748 A1* | 5/2020 | Hans | G09B 21/008 |
| 2021/0011711 A1* | 1/2021 | Ogawa | G06F 8/62 |
| 2021/0150264 A1* | 5/2021 | Karanam | G06N 3/045 |
| 2021/0215496 A1* | 7/2021 | Sese | G01C 21/3697 |
| 2021/0349709 A1* | 11/2021 | Nakatsukasa | G06F 8/656 |

* cited by examiner

INFORMATION PROCESSING APPARATUS, INFORMATION PROCESSING METHOD, AND INFORMATION PROCESSING SYSTEM TO ENABLE UPDATE OF A SOFTWARE

CROSS REFERENCE TO RELATED APPLICATIONS

This application is a U.S. National Phase of International Patent Application No. PCT/JP2021/023309 filed on Jun. 21, 2021, which claims priority benefit of Japanese Patent Application No. JP 2020-115428 filed in the Japan Patent Office on Jul. 3, 2020. Each of the above-referenced applications is hereby incorporated herein by reference in its entirety.

TECHNICAL FIELD

The present disclosure relates to an information processing apparatus, an information processing method, an information processing system, and a program, and more particularly, to an information processing apparatus, an information processing method, an information processing system, and a program capable of quickly and safely implementing update of a software program (SW).

BACKGROUND ART

Various problems occur in a software program (SW) mounted on hardware as use progresses, but development is progressed so as to solve the generated problems, an update SW for updating to the developed SW is repeatedly distributed, and the SW is updated by the update SW, thereby improving convenience.

However, in a case where the update by the update SW is not appropriately performed, the function by the SW cannot be exhibited, and for example, there is a possibility of causing a serious accident in an SW or the like related to automated driving in a vehicle or the like.

Therefore, in a case where the update by the update SW cannot be appropriately ended, a technology for ensuring safety by making the function related to the update SW unusable has been proposed (see Patent Document 1).

Furthermore, there has been proposed a technology for ensuring safety by adjusting a timing at which the update can be safely performed so that the update by the update SW can be appropriately ended (see Patent Document 2).

CITATION LIST

Patent Document

Patent Document 1: Japanese Patent Application Laid-Open No. 2011-081604
Patent Document 2: Japanese Patent Application Laid-Open No. 2013-148957

SUMMARY OF THE INVENTION

Problems to be Solved by the Invention

However, in the technology of Patent Document 1, even if it is possible to recognize whether or not the update of the update SW has been appropriately ended, or even if the update SW can be appropriately ended, it is not possible to recognize a case where the operating state becomes inappropriate due to a defect caused by the update.

For this reason, since it is not possible to recognize a defect caused by performing an appropriate update by the update SW, there is a possibility that safety cannot be sufficiently ensured.

Furthermore, it is conceivable to distribute the update SW after sufficiently developing the update SW until such a defect does not occur at all. However, in this case, it takes time to develop the update SW, the distribution of the update SW is delayed, and even if there is a defect in the SW before the update, improvement by the update cannot be implemented, and there is a possibility that the SW before the update has to be continuously used in a low safety state.

Furthermore, in the technology of Patent Document 2, as the timing for safely implementing the update by the update SW, for example, in the case of an SW of a vehicle or the like, the timing at which the vehicle stops is searched and set as the update timing. However, in a vehicle or the like having a relatively high use frequency, which is used by car sharing, a carrier, or the like, since the frequency of the stop state is low, it is difficult to implement the update since the timing at which the SW can be safely updated is extremely little. Even if there is a defect in the SW before the update due to a delay in the update of the SW, it is difficult to implement the improvement by the update, and there is a possibility that the SW before the update has to be continuously used in a low safety state.

The present disclosure has been made in view of such a situation, and in particular, enables update by the update SW to be quickly and safely implemented.

Solutions to Problems

An information processing apparatus, an information processing system, and a program according to one aspect of the present disclosure are an information processing apparatus, an information processing system, and a program including an update section that updates a software program (SW) of a moving apparatus for each processing unit constituting the SW.

An information processing method according to one aspect of the present disclosure is an information processing method including a step of updating a software program (SW) of a moving apparatus for each processing unit constituting the SW.

In one aspect of the present disclosure, a software program (SW) of a moving apparatus is updated for each processing unit constituting the SW.

MODE FOR CARRYING OUT THE INVENTION

Figure 1:
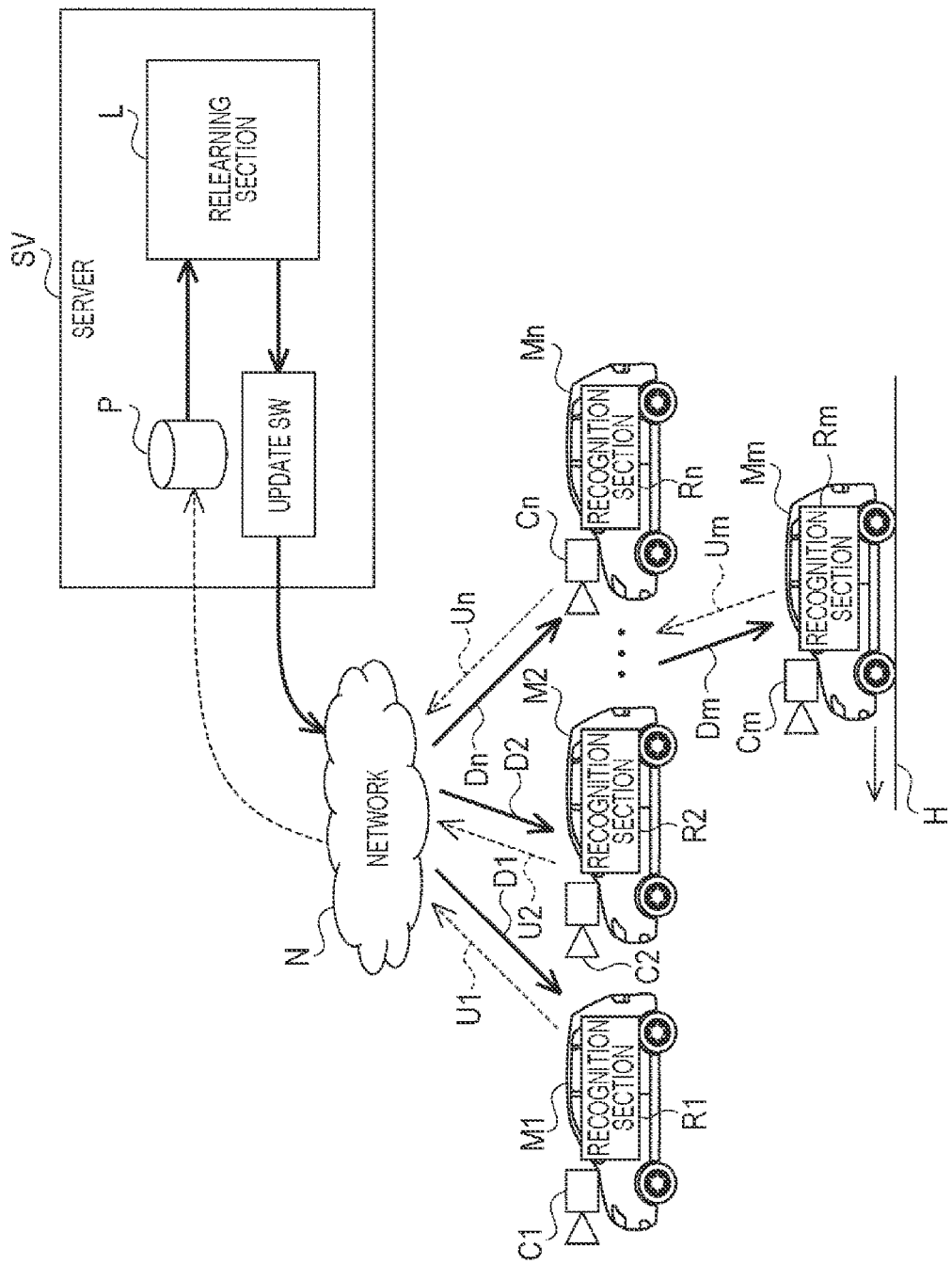
FIG. 1 is a diagram illustrating an overview of the present disclosure.

Hereinafter, preferred embodiments of the present disclosure will be described in detail with reference to the accompanying drawings. Note that, in the present specification and the drawings, components having substantially the same functional configuration are denoted by the same reference numerals, and redundant description is omitted.

Hereinafter, modes for carrying out the present technology will be described. The description will be given in the following order.

1. Overview of Present Disclosure
2. Configuration Example of Software (SW) Management System of Present Disclosure
3. Configuration Example of Vehicle Control System
4. Configuration Example of Server
5. Functions Implemented by Vehicle Control System of FIG. 3
6. Functions Implemented by Server of FIG. 4
7. Grouping of Vehicles
8. Grouping Processing
9. Relearning Processing
10. Update Processing
11. Update Timing Setting Processing (Part 1)
12. Update Timing Setting Processing (Part 2)
13. Update for Each Processing Unit
14. Update Processing for Each Processing Unit
15. Example Executed by Software 1. Overview of Present Disclosure The present disclosure enables a software program (SW) to be updated quickly and safely.

Note that, in the present specification, a case will be described as an example in which the SW is a recognition section that implements object recognition processing of recognizing an object present in the periphery on the basis of an image obtained by capturing the periphery of a vehicle capable of automated driving in order to implement automated driving. However, the SW applied to the present disclosure is not limited to the recognition section that implements the object recognition processing, and is only required to be an updatable SW.

Furthermore, the recognition section that implements the object recognition processing as the SW applied to the present disclosure is configured by machine learning.

It is known that an SW including a recognition section generated by machine learning can improve recognition accuracy by repeating further machine learning (relearning) with learning data collected for learning.

For this reason, for the SW such as the recognition section, while executing the object recognition processing, information of an image and a recognition result associated with the execution is collected as learning data, and the recognition accuracy is continuously improved by relearning using the collected learning data.

Therefore, in the following description, an SW management system that manages an SW as a recognition section mounted on a vehicle will be described as an example.

The SW management system in FIG. 1 includes vehicles M1 to Mn each including an SW as a recognition section, and a server Sv for managing the SW.

Each of the vehicles M1 to Mn includes cameras C1 to Cn and recognition sections R1 to Rn.

Note that the vehicles M1 to Mn, the cameras C1 to Cn, and the recognition sections R1 to Rn are distinguished from each other by n as an identifier. However, the vehicles M1 to Mn, the cameras C1 to Cn, and the recognition sections R1 to Rn have basically the same configuration. Hereinafter, the vehicles M1 to Mn, the cameras C1 to Cn, and the recognition sections R1 to Rn are also simply referred to as the vehicle M, the camera C, and the recognition section R in a case where it is not particularly necessary to distinguish the vehicles M1 to Mn, the cameras C1 to Cn, and the recognition sections R1 to Rn.

The camera C captures an image of the surroundings of the vehicle M required for implementing the automated driving of the vehicle M.

The recognition section R executes object recognition processing on the basis of the image captured by the camera C, and recognizes an object present around the vehicle M.

The vehicle M implements automated driving on the basis of the recognition result of the recognition section R.

Furthermore, the vehicles M1 to Mn transmits vehicle accumulation information U1 to Un obtained by combining the images captured by the cameras C1 to Cn and the recognition results of the object recognition processing implemented by the recognition sections R1 to Rn to the server Sv via the network N.

The server Sv accumulates, as a parameter P, the vehicle accumulation information U1 to Un obtained by combining the images captured by the cameras C1 to Cn and the recognition results of the recognition sections R1 to Rn transmitted from the vehicles M1 to Mn via the network N.

Furthermore, the server Sv includes a relearning section L of the recognition section R.

The relearning section L relearns the recognition section R by using the parameter P including the vehicle accumulation information U1 to Un as data for learning, generates an update SW for causing the current recognition section R to be updated to a relearned recognition section R, distributes the update SW to the vehicles M1 to Mn as distribution information D1 to Dn via the network N, and updates each of the recognition sections R1 to Rn.

Here, there is a case where the recognition section R is not appropriately updated by the update SW, and inappropriate object recognition processing is performed, and thus, there is a possibility that automated driving cannot be appropriately implemented.

For this reason, the update SW for updating the recognition section R needs to be distributed after safety is confirmed by sufficient simulation.

However, in order to generate the update SW such that the update processing for the recognition section R is in a complete state, the cost for the safety confirmation, in particular, the time required for the safety confirmation is enormous, and there is a possibility that the distribution of the update SW is delayed and the update of the recognition section R is delayed.

Therefore, in the present disclosure, among the vehicles M1 to Mn, the update SW is first distributed to a vehicle M group with less danger in which safety is ensured even in a case where an appropriate operation cannot be implemented by updating the recognition section R by the update SW, to update the recognition section R, the operating state after the update is confirmed, and the update SW is distributed to other vehicles M in a case where it is confirmed that there is no defect with sufficient operation.

More specifically, for example, in a case where the recognition section R is configured to recognize a pedestrian among objects, a recognition section Rm of a vehicle Mm traveling on a highway H among the vehicles M1 to Mn is updated by the update SW prior to the other vehicles M.

That is, since it is unlikely that the vehicle Mm traveling on the highway H recognizes a pedestrian during traveling and requires an operation to avoid contact, even if the vehicle Mm cannot appropriately recognize a pedestrian due to the update of the recognition section Rm, a fatal problem is unlikely to occur.

Furthermore, since there is a possibility that even the vehicle Mm traveling on the highway H recognizes a pedestrian present around the highway, it is possible to confirm whether or not the recognition section Rm after the updated is properly operating.

Therefore, in the present disclosure, the recognition section Rm of the vehicle Mm traveling on the highway H is updated by the update SW prior to the other vehicles M, and the recognition accuracy of pedestrians after the update is confirmed.

Then, if there is no defect in the object recognition processing of the recognition section Rm of the vehicle Mm, the update SW is also distributed to the recognition sections R of the vehicles M other than the vehicle Mm traveling on the highway, and the update is performed.

Furthermore, if there is a defect in the object recognition processing by the recognition section Rm updated by the update SW, the update by the update SW of the recognition sections R of the other vehicles M is stopped, and the processing of causing the relearning section L to relearn the update SW is repeated.

As a result, it is possible to confirm the presence or absence of the defect by updating the recognition section R of the vehicle 1 in which safety is ensured by the update SW while suppressing the cost for reducing the occurrence of the defect related to the object recognition processing of the recognition section R updated by the update SW generated by the relearning of the recognition section R.

Furthermore, since it is possible to suppress the time related to relearning for improving the perfection of the update SW, it is possible to quickly implement the distribution of the update SW.

Moreover, even if there is a defect in the object recognition processing of the recognition section R updated by the update SW, the defect related to the object recognition processing by the updated recognition section R is confirmed in a vehicle Mm in which safety is ensured, and the distribution of the update SW is stopped. Therefore, recognition sections R of vehicles M in which safety is not ensured other than the vehicle Mm are not updated by the defective update SW, so that the safety related to the update by the update SW can be improved.

As a result, it is possible to quickly and safely implement the update of the recognition section R of the vehicle M by the update SW.

2. Configuration Example of SW Management System of Present Disclosure

Next, a configuration example of the SW management system of the present disclosure will be described with reference to FIG. 2.

The SW management system 10 of the present disclosure includes vehicles 1-1 to 1-$n$, a server 2, and a network 3. Note that, in a case where there is no particular need to distinguish the vehicles 1-1 to 1-$n$, the vehicles 1-1 to 1-$n$ are simply referred to as a vehicle 1, and other configurations are similarly referred to.

The vehicles 1-1 to 1-$n$ have configurations corresponding to the vehicles M1 to Mn in FIG. 1, and are vehicles capable of automated driving.

The vehicles 1-1 to 1-$n$ include cameras 1$a$-1 to 1$a$-$n$ that capture images of the surroundings, and recognition sections 1$b$-1 to 1$b$-$n$ that recognize objects present in the surroundings on the basis of the images captured by the cameras 1$a$-1 to 1$a$-$n$, and automated driving is implemented on the basis of the recognition results of the recognition sections 1$b$-1 to 1$b$-$n$.

Furthermore, each of the recognition sections 1$b$-1 to 1$b$-$n$ mounted on each of the vehicles 1-1 to 1-$n$ is a software program (SW), and the update is repeated by the update SW distributed from the server 2.

Note that the cameras 1$a$-1 to 1$a$-$n$ may not have the same structure, but the recognition sections 1$b$-1 to 1$b$-$n$ are the same since the update is repeated by the update SW distributed from the server 2.

Moreover, the vehicles 1-1 to 1-$n$ accumulates information obtained by combining the images captured by the cameras 1$a$-1 to 1$a$-$n$ and the recognition results of the recognition sections 1$b$-1 to 1$b$-$n$ as vehicle accumulation information, and transmit the accumulated information to the server 2 via the network 3.

The server 2 causes the recognition section 1$b$ to relearn by using the vehicle accumulation information transmitted from each of the vehicles 1-1 to 1-$n$ via the network 3 as learning data.

Then, the server 2 generates the relearned recognition section 1$b$ as the update SW, distributes the update SW to the vehicles 1-1 to 1-$n$ via the network 3, and updates each of the recognition sections 1$b$-1 to 1$b$-$n$.

When the update SW is distributed to update the recognition sections 1$b$-1 to 1$b$-$n$, the server 2 distributes and updates the update SW from a vehicle 1 (group) having a small influence even if a defect occurs in the operating state due to the update of the recognition section 1$b$ among the vehicles 1-1 to 1-$n$.

Then, the server 2 confirms the operating state of the recognition section 1$b$ updated by the update SW, and when there is no defect in the operating state, the server 2 distributes the update SW to the other vehicles 1 and causes the other vehicles 1 to update.

With this operation, when the recognition section 1$b$ is updated by the update SW, if the update cannot be appropriately completed, or if a detect occurs in which the recognition accuracy becomes lower than that of the recognition section 1$b$ before the update even if the update is appropriately performed, the update can be performed after the defect is improved by relearning.

Furthermore, for the vehicle 1 (group) to which the SW is distributed first, even if there is a defect in the operating state of the recognition section 1*b* updated by the update SW, only the recognition section 1*b* of the vehicle 1 in which safety is ensured is updated, so that occurrence of a fatal problem can be suppressed.

Moreover, by first confirming the operating state of the recognition section 1*b* in the vehicle 1 in which the update SW has been updated, it is possible to confirm the presence or absence of a defect related to the update and then distribute the SW to other vehicles 1, so that distribution to a vehicle 1 having a large influence in a case where a defect occurs in the recognition section 1*b* updated by the update SW can be distributed after sufficient safety is ensured.

As a result, even if the update SW is distributed to the vehicle 1 without being developed to a state where complete safety can be ensured, a serious problem does not occur. Therefore, at the stage of a certain degree of completion, the update SW can be distributed to the vehicle 1 where safety is ensured, the recognition section 1*b* can be updated, and the presence or absence of a defect can be confirmed. Therefore, it is possible to implement quick distribution of the update SW.

Furthermore, since the SW can be distributed to the other vehicles 1 in a state in which the safety of the update SW is ensured to some extent, the update of the recognition section 1*b* by the update SW can be safely implemented.

3. Configuration Example of Vehicle Control System

Figure 3:
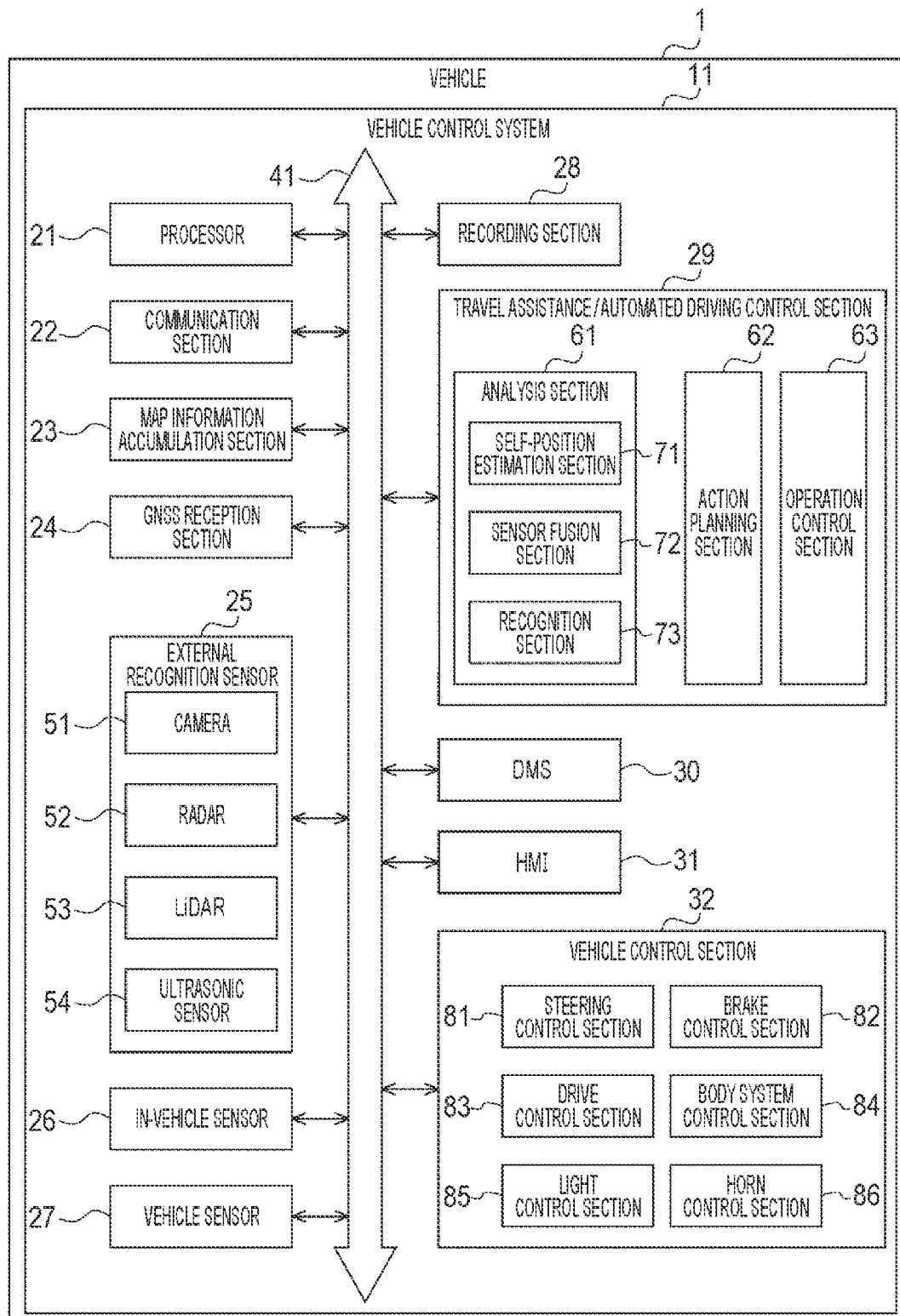
FIG. 3 is a block diagram illustrating a configuration example of a vehicle control system.

FIG. 3 is a block diagram illustrating a configuration example of a vehicle control system 11 which is an example of a moving apparatus control system of the vehicle 1 to which the present technology is applied.

The vehicle control system 11 is provided in the vehicle 1 and performs processing related to travel assistance and automated driving of the vehicle 1.

The vehicle control system 11 includes a processor 21, a communication section 22, a map information accumulation section 23, a global navigation satellite system (GNSS) reception section 24, an external recognition sensor 25, an in-vehicle sensor 26, a vehicle sensor 27, a recording section 28, a travel assistance/automated driving control section 29, a driver monitoring system (DMS) 30, a human machine interface (HMI) 31, and a vehicle control section 32.

The processor 21, the communication section 22, the map information accumulation section 23, the GNSS reception section 24, the external recognition sensor 25, the in-vehicle sensor 26, the vehicle sensor 27, the recording section 28, the travel assistance/automated driving control section 29, the driver monitoring system (DMS) 30, the human machine interface (HMI) 31, and the vehicle control section 32 are connected to one another via a communication network 41. The communication network 41 includes, for example, an in-vehicle communication network, a bus, or the like conforming to an arbitrary standard such as a controller area network (CAN), a local interconnect network (LIN), a local area network (LAN), FlexRay (registered trademark), Ethernet (registered trademark), or the like. Note that each section of the vehicle control system 11 may be directly connected by, for example, near field communication (NFC), Bluetooth (registered trademark), or the like without passing through the communication network 41.

Note that, hereinafter, in a case where each section of the vehicle control system 11 performs communication via the communication network 41, description of the communication network 41 will be omitted. For example, in a case where the processor 21 and the communication section 22 perform communication via the communication network 41, it is simply described that the processor 21 and the communication section 22 perform communication.

The processor 21 includes various processors such as a central processing unit (CPU), a micro processing unit (MPU), an electronic control unit (ECU), or the like, for example. The processor 21 controls the entire vehicle control system 11.

The communication section 22 communicates with various devices inside and outside the vehicle, other vehicles, servers, base stations, and the like, and transmits and receives various data. As the communication with the outside of the vehicle, for example, the communication section 22 receives a program for updating software for controlling the operation of the vehicle control system 11, map information, traffic information, information around the vehicle 1, and the like from the outside. For example, the communication section 22 transmits information regarding the vehicle 1 (for example, data indicating the state of the vehicle 1, a recognition result by the recognition section 73, and the like), information around the vehicle 1, and the like to the outside. For example, the communication section 22 performs communication corresponding to a vehicle emergency call system such as an eCall or the like.

Note that a communication method of the communication section 22 is not particularly limited. Furthermore, a plurality of communication methods may be used.

As communication with the inside of the vehicle, for example, the communication section 22 performs wireless communication with a device in the vehicle by a communication method such as wireless LAN, Bluetooth, NFC, wireless USB (WUSB), or the like. For example, the communication section 22 performs wired communication with a device in the vehicle by a communication method such as a universal serial bus (USB), a high-definition multimedia interface (HDMI, registered trademark), a mobile high-definition link (MHL), or the like via a connection terminal (and, if necessary, a cable) not illustrated.

Here, the in-vehicle device is, for example, a device that is not connected to the communication network 41 in the vehicle. For example, a mobile device or a wearable device carried by an occupant such as a driver or the like, an information device brought into the vehicle and temporarily installed, or the like is assumed.

For example, the communication section 22 communicates with a server or the like present on an external network (for example, the Internet, a cloud network, or a company-specific network) via a base station or an access point by a wireless communication method such as fourth generation mobile communication system (4G), fifth generation mobile communication system (5G), long term evolution (LTE), dedicated short range communications (DSRC), or the like.

For example, the communication section 22 communicates with a terminal (for example, a terminal of a pedestrian or a store, or a machine type communication (MTC) terminal) present in the vicinity of the host vehicle using a peer to peer (P2P) technology. For example, the communication section 22 performs V2X communication. The V2X communication is, for example, vehicle to vehicle communication with another vehicle, vehicle to infrastructure communication with a roadside device or the like, vehicle to home communication, vehicle to pedestrian communication with a terminal or the like possessed by a pedestrian, or the like.

For example, the communication section 22 receives an electromagnetic wave transmitted by a road traffic information communication system (vehicle information and communication system (VICS), registered trademark) such as a radio wave beacon, an optical beacon, FM multiplex broadcasting, or the like.

The map information accumulation section 23 accumulates a map acquired from the outside and a map created by the vehicle 1. For example, the map information accumulation section 23 accumulates a three-dimensional high-precision map, a global map having lower accuracy than the highly accurate map but covering a wide area, and the like.

The high-precision map is, for example, a dynamic map, a point cloud map, a vector map (also referred to as an advanced driver assistance system (ADAS) map), or the like. The dynamic map is, for example, a map including four layers of dynamic information, semi-dynamic information, semi-static information, and static information, and is provided from an external server or the like. The point cloud map is a map including point clouds (point cloud data). The vector map is a map in which information such as a lane, a position of a signal, and the like is associated with the point cloud map. The point cloud map and the vector map may be provided from, for example, an external server or the like, or may be created by the vehicle 1 as a map for performing matching with a local map to be described later on the basis of a sensing result by a radar 52, a LiDAR 53, or the like, and may be accumulated in the map information accumulation section 23. Furthermore, in a case where a high-precision map is provided from an external server or the like, for example, map data of several hundred meters square regarding a planned route on which the vehicle 1 travels from now is acquired from the server or the like in order to reduce the communication capacity.

The GNSS reception section 24 receives a GNSS signal from a GNSS satellite, and supplies the GNSS signal to the travel assistance/automated driving control section 29.

The external recognition sensor 25 includes various sensors used for recognizing a situation outside the vehicle 1, and supplies sensor data from each sensor to each section of the vehicle control system 11. The type and number of sensors included in the external recognition sensor 25 are arbitrary.

For example, the external recognition sensor 25 includes a camera 51, a radar 52, a light detection and ranging or laser imaging detection and ranging (LiDAR) 53, and an ultrasonic sensor 54. The number of the cameras 51, the radars 52, the LiDARs 53, and the ultrasonic sensors 54 is arbitrary, and an example of a sensing area of each sensor will be described later.

Note that, as the camera 51, for example, a camera of an arbitrary imaging method such as a time of flight (ToF) camera, a stereo camera, a monocular camera, an infrared camera, or the like is used as necessary.

Furthermore, for example, the external recognition sensor 25 includes an environment sensor for detecting weather, climate, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each section of the vehicle control system 11. The type and number of sensors included in the in-vehicle sensor 26 are arbitrary.

For example, the in-vehicle sensor 26 includes a camera, a radar, a seating sensor, a steering wheel sensor, a microphone, a biometric sensor, and the like. As the camera, for example, a camera of any imaging method such as a ToF camera, a stereo camera, a monocular camera, an infrared camera, or the like can be used. The biometric sensor is provided, for example, on a seat, a steering wheel, or the like, and detects various types of biometric information of an occupant such as a driver and the like.

The vehicle sensor 27 includes various sensors for detecting the state of the vehicle 1, and supplies sensor data from each sensor to each section of the vehicle control system 11. The type and number of sensors included in the vehicle sensor 27 are arbitrary.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of rotations of the engine or the motor, an air pressure sensor that detects the air pressure of the tire, a slip rate sensor that detects the slip rate of the tire, and a wheel speed sensor that detects the rotation speed of the wheel. For example, the vehicle sensor 27 includes a battery sensor that detects the remaining amount and temperature of the battery, and an impact sensor that detects an external impact.

The recording section 28 includes, for example, a read only memory (ROM), a random access memory (RAM), a magnetic storage device such as a hard disc drive (HDD) or the like, a semiconductor storage device, an optical storage device, a magneto-optical storage device, and the like. The recording section 28 records various programs, data, and the like used by each section of the vehicle control system 11. For example, the recording section 28 records a rosbag file including a message transmitted and received by a robot operating system (ROS) in which an application program related to automated driving operates. For example, the recording section 28 includes an event data recorder (EDR) and a data storage system for automated driving (DSSAD), and records information of the vehicle 1 before and after an event such as an accident or the like.

The travel assistance/automated driving control section 29 controls travel assistance and automated driving of the vehicle 1. For example, the travel assistance/automated driving control section 29 includes an analysis section 61, an action planning section 62, and an operation control section 63.

The analysis section 61 performs analysis processing of the situation of the vehicle 1 and the surroundings. The analysis section 61 includes a self-position estimation section 71, a sensor fusion section 72, and a recognition section 73.

The self-position estimation section 71 estimates the self-position of the vehicle 1 on the basis of the sensor data from the external recognition sensor 25 and the high-precision map accumulated in the map information accumulation section 23. For example, the self-position estimation section 71 generates a local map on the basis of sensor data from the external recognition sensor 25, and estimates the self-position of the vehicle 1 by matching the local map with the high-precision map. The position of the vehicle 1 is based on, for example, the center of the rear wheel pair axle.

The local map is, for example, a three-dimensional high-precision map created using a technology such as simultaneous localization and mapping (SLAM), or the like, an occupancy grid map, or the like. The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated in units of grids. The occupancy state of the object is indicated by, for example, the presence or absence or existence probability of the object. The local map is also used for detection processing and recognition processing of a situation outside the vehicle 1 by the recognition section 73, for example.

Note that the self-position estimation section 71 may estimate the self-position of the vehicle 1 on the basis of the GNSS signal and the sensor data from the vehicle sensor 27.

The sensor fusion section 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition section 73 performs detection processing and recognition processing of a situation outside the vehicle 1.

For example, the recognition section 73 performs detection processing and recognition processing of a situation outside the vehicle 1 on the basis of information from the external recognition sensor 25, information from the self-position estimation section 71, information from the sensor fusion section 72, and the like.

Specifically, for example, the recognition section 73 performs detection processing, recognition processing, and the like of an object around the vehicle 1. The object detection processing is, for example, processing of detecting the presence or absence, size, shape, position, movement, and the like of an object. The object recognition processing is, for example, processing of recognizing an attribute such as a type of an object or the like or identifying a specific object. However, the detection processing and the recognition processing are not necessarily clearly divided, and may overlap.

For example, the recognition section 73 detects an object around the vehicle 1 by performing clustering for classifying point clouds based on sensor data such as LiDAR, radar, or the like for each cluster of point clouds. As a result, the presence or absence, size, shape, and position of an object around the vehicle 1 are detected.

For example, the recognition section 73 detects the motion of the object around the vehicle 1 by performing tracking that follows the motion of the cluster of the point cloud classified by clustering. As a result, the speed and the traveling direction (movement vector) of the object around the vehicle 1 are detected.

For example, the recognition section 73 recognizes the type of the object around the vehicle 1 by performing object recognition processing such as semantic segmentation or the like on the image data supplied from the camera 51.

Note that, as the object to be detected or recognized, for example, a vehicle, a person, a bicycle, an obstacle, a structure, a road, a traffic light, a traffic sign, a road sign, and the like are assumed.

For example, the recognition section 73 performs recognition processing of traffic rules around the vehicle 1 on the basis of the map accumulated in the map information accumulation section 23, the estimation result of the self-position, and the recognition result of the object around the vehicle 1. By this processing, for example, the position and the state of the signal, the contents of the traffic sign and the road sign, the contents of the traffic regulation, the travelable lane, and the like are recognized.

For example, the recognition section 73 performs recognition processing of the environment around the vehicle 1. As the surrounding environment to be recognized, for example, weather, temperature, humidity, brightness, a state of a road surface, and the like are assumed.

The action planning section 62 creates an action plan of the vehicle 1. For example, the action planning section 62 creates an action plan by performing processing of route planning and route following.

Note that the route planning (global path planning) is a process of planning a rough route from the start to the goal. This route planning is called a track planning, and includes processing of track generation (local path planning) that enables safe and smooth traveling in the vicinity of the vehicle 1 in consideration of the motion characteristics of the vehicle 1 in the route planned by the route planning.

Route following is a process of planning an operation for safely and accurately traveling a route planned by route planning within a planned time. For example, the target speed and the target angular velocity of the vehicle 1 are calculated.

The operation control section 63 controls the operation of the vehicle 1 in order to implement the action plan created by the action planning section 62.

For example, the operation control section 63 controls a steering control section 81, a brake control section 82, and a drive control section 83 to perform acceleration/deceleration control and direction control such that the vehicle 1 travels on the track calculated by the track planning. For example, the operation control section 63 performs cooperative control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the operation control section 63 performs cooperative control for the purpose of automated driving or the like in which the vehicle automatedly travels without depending on the operation of the driver.

The DMS 30 performs a driver authentication processing, a driver state recognition processing, and the like on the basis of sensor data from the in-vehicle sensor 26, input data input to the HMI 31, and the like. As the state of the driver to be recognized, for example, a physical condition, a wakefulness level, a concentration level, a fatigue level, a line-of-sight direction, a drunkenness level, a driving operation, a posture, and the like are assumed.

Note that the DMS 30 may perform authentication processing of an occupant other than the driver and recognition processing of the state of the occupant. Furthermore, for example, the DMS 30 may perform recognition processing of the situation inside the vehicle on the basis of sensor data from the in-vehicle sensor 26. As the situation inside the vehicle to be recognized, for example, temperature, humidity, brightness, odor, and the like are assumed.

The HMI 31 is used for inputting various data, instructions, and the like, generates a signal input on the basis of the input data, instructions, and the like, and supplies the input signal to each section of the vehicle control system 11. For example, the HMI 31 includes an operation device such as a touch panel, a button, a microphone, a switch, a lever, and the like, an operation device that can input by a method other than manual operation such as voice, gesture, or the like, and the like. Note that the HMI 31 may be, for example, a remote control device using infrared rays or other radio waves, or an external connection device such as a mobile device, a wearable device, or the like compatible with the operation of the vehicle control system 11.

Furthermore, the HMI 31 performs output control to control generation and output of visual information, auditory information, and tactile information on the occupant or the outside of the vehicle, output content, output timing, an output method, and the like. The visual information is, for example, information indicated by an image or light such as an operation screen, a state display of the vehicle 1, a warning display, a monitor image indicating a situation around the vehicle 1, or the like. The auditory information is, for example, information indicated by sound such as guidance, a warning sound, a warning message, or the like. The tactile information is, for example, information given to the tactile sense of the occupant by force, vibration, motion, or the like.

As a device that outputs visual information, for example, a display device, a projector, a navigation device, an instrument panel, a camera monitoring system (CMS), an electronic mirror, a lamp, and the like are assumed. The display device may be, for example, a device that displays visual information in the field of view of the occupant, such as a head-up display, a transmissive display, a wearable device having an augmented reality (AR) function, or the like, in addition to a device having a normal display.

As a device that outputs auditory information, for example, an audio speaker, a headphone, an earphone, or the like is assumed.

As a device that outputs tactile information, for example, a haptics element using haptics technology or the like is assumed. The haptics element is provided, for example, on a steering wheel, a seat, or the like.

The vehicle control section 32 controls each section of the vehicle 1. The vehicle control section 32 includes a steering control section 81, a brake control section 82, a drive control section 83, a body system control section 84, a light control section 85, and a horn control section 86.

The steering control section 81 detects and controls the state of the steering system of the vehicle 1 or the like. The steering system includes, for example, a steering mechanism including a steering wheel and the like, an electric power steering, and the like. The steering control section 81 includes, for example, a control unit such as an ECU or the like that controls the steering system, an actuator that drives the steering system, and the like.

The brake control section 82 detects and controls the state of the brake system of the vehicle 1 or the like. The brake system includes, for example, a brake mechanism including a brake pedal, an antilock brake system (ABS), and the like. The brake control section 82 includes, for example, a control unit such as an ECU or the like that controls a brake system, an actuator that drives the brake system, and the like.

The drive control section 83 detects and controls the state of the drive system of the vehicle 1 or the like. The drive system includes, for example, a driving force generation device for generating a driving force such as an accelerator pedal, an internal combustion engine, a driving motor, or the like, a driving force transmission mechanism for transmitting the driving force to wheels, and the like. The drive control section 83 includes, for example, a control unit such as an ECU or the like that controls the drive system, an actuator that drives the drive system, and the like.

The body system control section 84 detects and controls the state of the body system of the vehicle 1 or the like. The body system includes, for example, a keyless entry system, a smart key system, a power window device, a power seat, an air conditioner, an airbag, a seat belt, a shift lever, and the like. The body system control section 84 includes, for example, a control unit such as an ECU or the like that controls the body system, an actuator that drives the body system, and the like.

The light control section 85 detects and controls states of various lights of the vehicle 1 or the like. As the light to be controlled, for example, a headlight, a backlight, a fog light, a turn signal, a brake light, a projection, a display of a bumper, and the like are assumed. The light control section 85 includes a control unit such as an ECU or the like that controls light, an actuator that drives light, and the like.

The horn control section 86 detects and controls the state of the car horn of the vehicle 1 or the like. The horn control section 86 includes, for example, a control unit such as an ECU or the like that controls the car horn, an actuator that drives the car horn, and the like.

Figure 4:
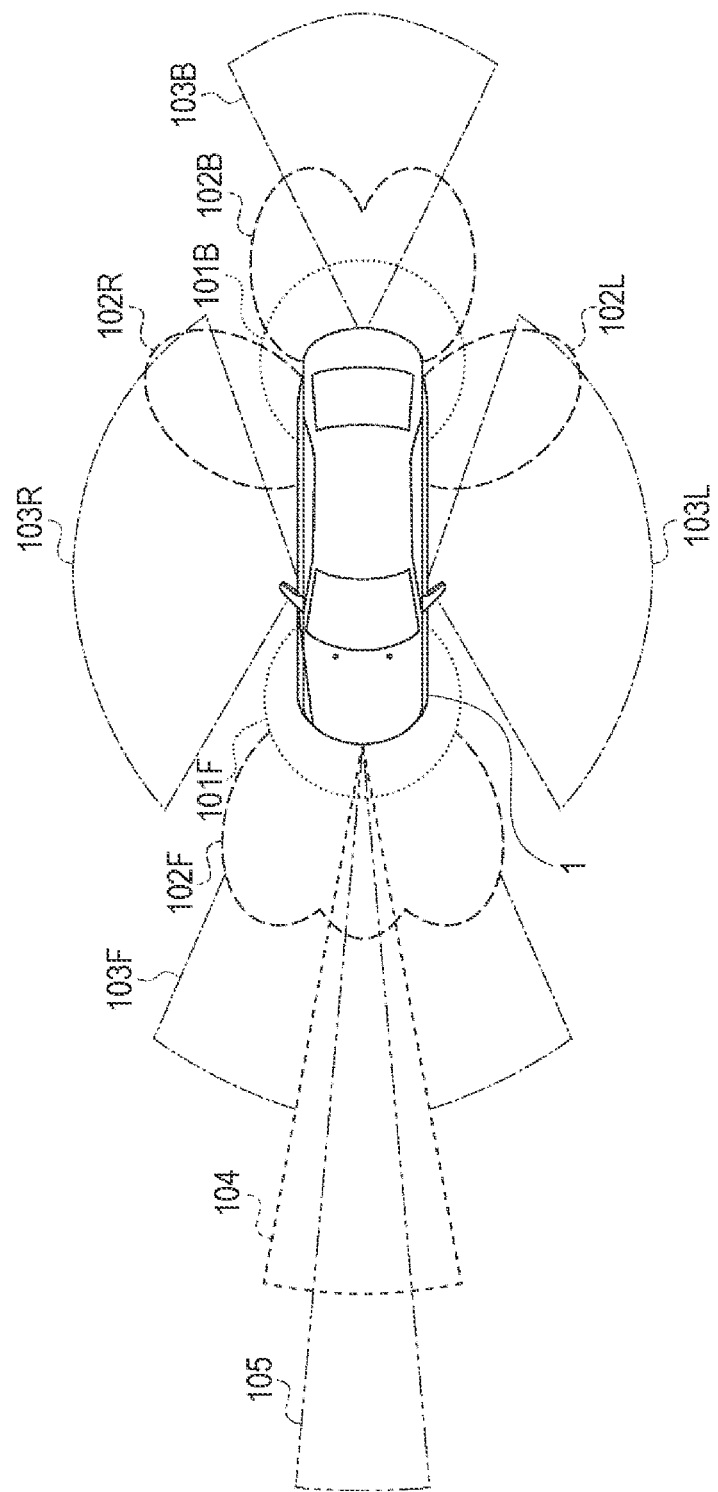
FIG. 4 is a diagram illustrating an example of sensing areas.

FIG. 4 is a diagram illustrating an example of sensing areas by the camera 51, the radar 52, the LiDAR 53, and the ultrasonic sensor 54 of the external recognition sensor 25 in FIG. 3.

The sensing area 101F and the sensing area 101B illustrate examples of sensing areas of the ultrasonic sensor 54. The sensing area 101F covers the periphery of the front end of the vehicle 1. The sensing area 101B covers the periphery of the rear end of the vehicle 1.

The sensing results in the sensing area 101F and the sensing area 101B are used, for example, for parking assistance of the vehicle 1 or the like.

The sensing areas 102F to 102B illustrate examples of sensing areas of the radar 52 for a short distance or a middle distance. The sensing area 102F covers a position farther than the sensing area 101F in front of the vehicle 1. The sensing area 102B covers a position farther than the sensing area 101B behind the vehicle 1. The sensing area 102L covers the rear periphery of the left side surface of the vehicle 1. The sensing area 102R covers the rear periphery of the right side surface of the vehicle 1.

The sensing result in the sensing area 102F is used, for example, to detect a vehicle, a pedestrian, or the like present in front of the vehicle 1. The sensing result in the sensing area 102B is used, for example, for a collision prevention function or the like behind the vehicle 1. The sensing results in the sensing area 102L and the sensing area 102R are used, for example, for detecting an object in a blind spot on the sides of the vehicle 1 or the like.

The sensing areas 103F to 103B illustrate examples of sensing areas by the camera 51. The sensing area 103F covers a position farther than the sensing area 102F in front of the vehicle 1. The sensing area 103B covers a position farther than the sensing area 102B behind the vehicle 1. The sensing area 103L covers the periphery of the left side surface of the vehicle 1. The sensing area 103R covers the periphery of the right side surface of the vehicle 1.

The sensing result in the sensing area 103F is used for, for example, recognition of a traffic light or a traffic sign, a lane departure prevention assist system, and the like. The sensing result in the sensing area 103B is used for, for example, parking assistance, a surround view system, and the like.

The sensing results in the sensing area 103L and the sensing area 103R are used, for example, in a surround view system or the like.

The sensing area 104 illustrates an example of a sensing area of the LiDAR 53. The sensing area 104 covers a position farther than the sensing area 103F in front of the vehicle 1. Meanwhile, the sensing area 104 has a narrower range in the left-right direction than the sensing area 103F.

The sensing result in the sensing area 104 is used for, for example, emergency braking, collision avoidance, pedestrian detection, and the like.

The sensing area 105 illustrates an example of a sensing area of the long-range radar 52. The sensing area 105 covers a position farther than the sensing area 104 in front of the vehicle 1. Meanwhile, the sensing area 105 has a narrower range in the left-right direction than the sensing area 104.

The sensing result in the sensing area 105 is used for, for example, adaptive cruise control (ACC) or the like.

Note that the sensing area of each sensor may have various configurations other than those in FIG. 4. Specifically, the ultrasonic sensor 54 may also sense the sides of the vehicle 1, or the LiDAR 53 may sense the rear of the vehicle 1.

Figure 2:
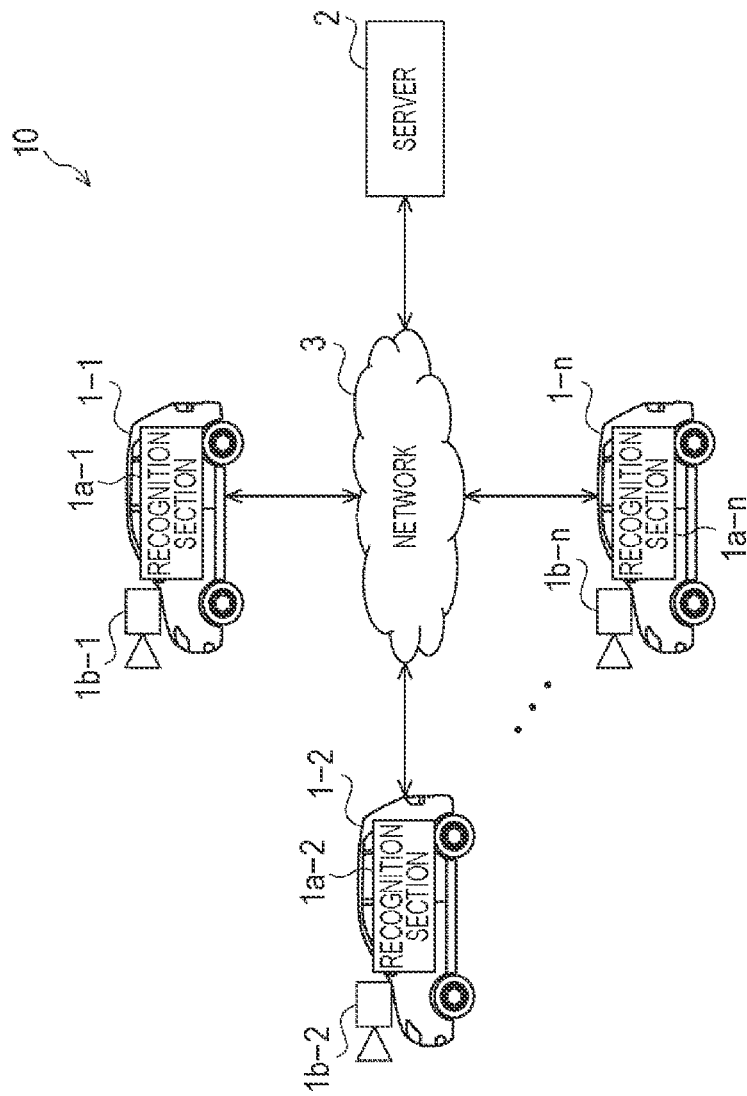
FIG. 2 is a block diagram illustrating a configuration example of an SW management system of the present disclosure.

Note that the camera 51 and the recognition section 73 in FIG. 3 have configurations corresponding to the camera 1a and the recognition section 1b in FIG. 2.

4. Configuration Example of Server

Next, a configuration example of the server 2 will be described with reference to FIG. 5.

The server 2 includes a processor 111, an input section 112, an output section 113, a storage section 114, a communication section 115, a drive 116, and a removable storage medium 117, and is connected to each other via a bus 118, and can transmit and receive data and programs.

The processor 111 controls the entire operation of the server 2. Furthermore, the processor 111 manages update of the recognition section 73 as the SW. Moreover, the processor 111 recognizes the operation state of the recognition section 73 as the SW and transmits the operation state to the server 2.

The input section 112 includes an input device such as a keyboard, a mouse, and the like with which the user inputs an operation command, and supplies various input signals to the processor 111.

The output section 113 is controlled by the processor 111, and outputs an image of a supplied operation screen and a processing result to a display device including a liquid crystal display (LCD), an organic electro luminescence (EL), or the like to display.

The storage section 114 includes a hard disk drive (HDD), a solid state drive (SSD), a semiconductor memory, or the like, is controlled by the processor 111, and writes or reads various data and programs including content data.

The communication section 115 is controlled by the processor 111, and transmits and receives various data and programs to and from various devices via a communication network represented by a local area network (LAN) or the like in a wired (or wireless (not illustrated)) manner.

The drive 116 reads and writes data from and to the removable storage medium 117 such as a magnetic disk (including a flexible disk), an optical disk (including a compact disc-read only memory (CD-ROM) and a digital versatile disc (DVD)), a magneto-optical disk (including a mini disc (MD)), a semiconductor memory, or the like.

5. Functions Implemented by Vehicle Control System of FIG. 3

Figure 6:
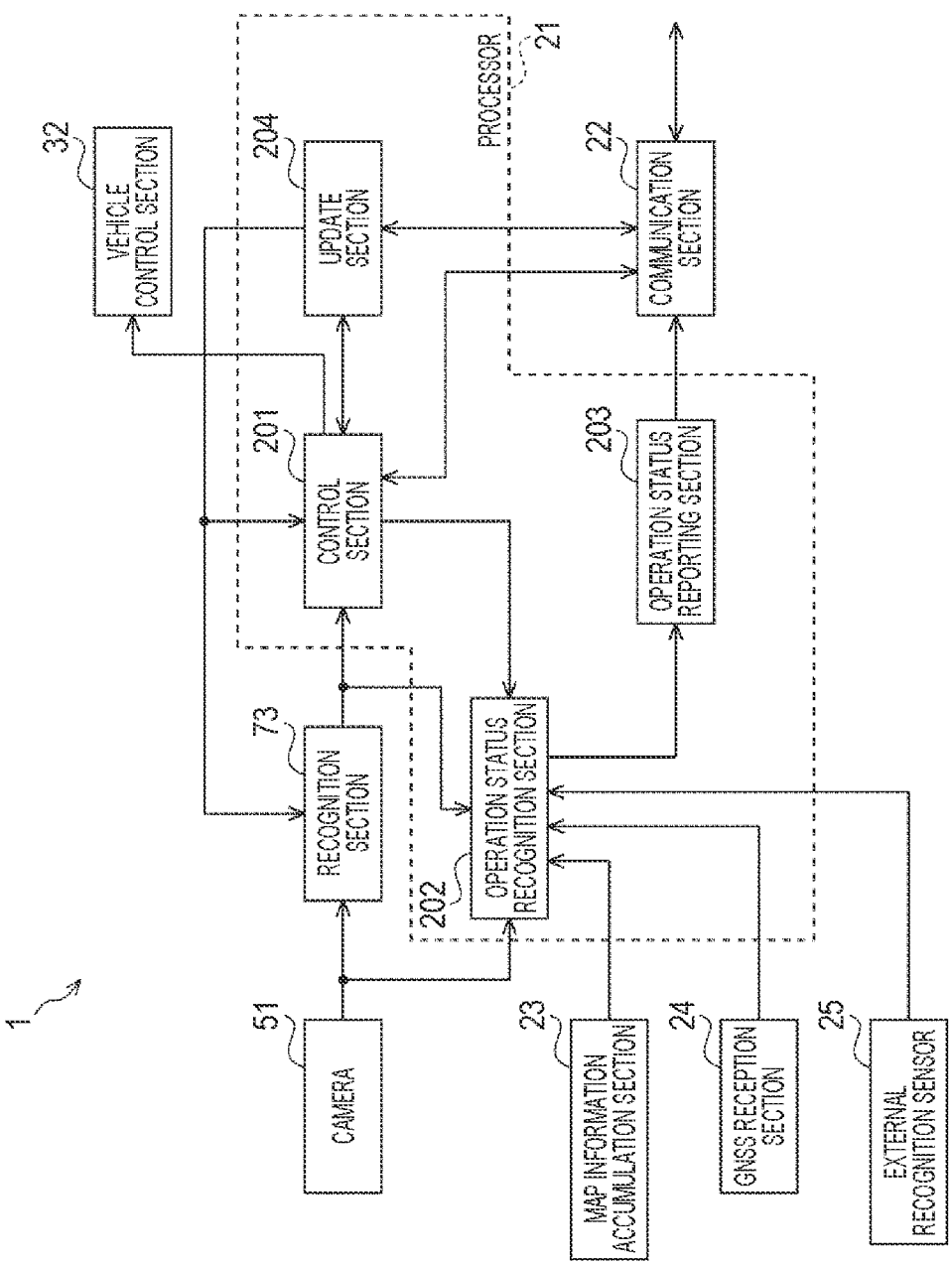
FIG. 6 is a functional block diagram illustrating functions implemented by the vehicle control system of FIG. 3.

Next, functions implemented by the vehicle 1 of FIG. 3 will be described with reference to a functional block diagram of FIG. 6.

The processor 21 of the vehicle 1 implements functions as a control section 201, an operation status recognition section 202, an operation status reporting section 203, and an update section 204.

The control section 201 controls the entire operation of the vehicle control system 11, and outputs various control signals.

Furthermore, the control section 201 outputs a control signal for controlling various operations of the vehicle 1 to the vehicle control section 32 on the basis of the object recognition result by the recognition section 73 based on the image captured by the camera 51.

Moreover, the control section 201 controls the operation of the operation status recognition section 202 to recognize the operation status of the recognition section 73.

Furthermore, when vehicle information required for grouping the vehicles 1 is requested by the server 2, the control section 201 controls the communication section 22 to transmit the vehicle information. Note that the vehicle information required for grouping the vehicles 1 will be described later when the configuration of the server 2 is described.

The operation status recognition section 202 recognizes the operation status of the recognition section 73 on the basis of the image captured by the camera 51 and the object recognition result of the recognition section 73 corresponding to the image captured by the camera 51.

More specifically, for example, the operation status recognition section 202 specifies an object that can be recognized from the map information corresponding to the current position information on the basis of the map information of the map information accumulation section 23 and the position information based on the signals from the GNSS reception section 24 and the external recognition sensor 25, in addition to the image captured by the camera 51 and the object recognition result of the recognition section 73 based on the image captured by the camera 51, determines whether or not the recognition section 73 is appropriately operating by comparison with the object recognition result, recognizes the determination result as the operation status, and outputs the operation status reporting section 203.

For example, the operation status recognition section 202 reads, from the map information, a position specified on the basis of the GNSS signal of the GNSS reception section 24 and the signal of the external recognition sensor 25 and information on an object present within the angle of view of the camera 51 based on the direction of the vehicle 1 at the specified position, compares the information with the recognition result of the recognition section 73, and recognizes the comparison result as the operation status.

That is, in a case where, for example, a specific sign, a specific building, or the like is read as an object present in the vicinity read from the map information at the position specified on the basis of the GNSS signal, the operation status recognition section 202 determines that the operation status is appropriate if the recognition result of the recognition section 73 at that time matches the specific sign, the specific building, or the like read from the map information, and determines that the operation status is not appropriate if the recognition result does not match the specific sign, the specific building, or the like read from the map information.

The object to be compared with the recognition result may be an object specified from map information such as a specific sign, a specific building or the like, or may be a dedicated marker or the like for confirming the operation status of the recognition section 73.

Furthermore, the object to be compared with the recognition result may be an object that can be recognized along with a phenomenon that is expected to occur from a position, a time zone, and the like, and may be, for example, a vehicle, a pedestrian, or the like in a traffic jam that is expected to occur from a position, a time zone, and the like. In this case, whether or not it is possible to recognize that the vehicle or the pedestrian is moving may also be used for determining the operation status of the recognition section 73.

Moreover, the object to be compared with the recognition result may be a sensitive signal that operates with V2X communication or approach of the vehicle 1, a gate bar of a parking lot, or the like. In this case, whether or not the sensitive signal changes from red to green as the vehicle 1 approaches, or whether or not a change in operation such as opening or closing of the gate bar is recognized as a recognition result may also be used for the determination of the operation status.

Furthermore, the operation status recognition section 202 may back up the recognition section 73 before the update, compare the recognition rate of the recognition section 73 before the update with the recognition rate of the recognition section 73 after the update, and regard the comparison result as the operation status. In this case, when the recognition rate of the recognition section 73 after the update is not lower than the recognition rate of the recognition section 73 before the update and there is no deterioration, it may be considered that appropriate update has been performed, and conversely, when the recognition rate is lowered and there is deterioration, it may be considered that inappropriate update has been performed.

The operation status reporting section 203 determines whether or not reporting to the server 2 is necessary on the basis of the information of the operation status supplied from the operation status recognition section 202, and controls the communication section 22 to transmit the image captured by the camera 51 and the recognition result together to the server 2 when determining that reporting to the server 2 is necessary. For example, when the operation status is inappropriate, the operation status reporting section 203 reports the image captured by the camera 51 and the recognition result together to the server 2.

Note that, for example, when the operation status is appropriate, the operation status reporting section 203 may report the image captured by the camera 51 and the recognition result together to the server 2.

Furthermore, the operation status reporting section 203 may report the operation status together with the image captured by the camera 51 and the recognition result to the server 2 regardless of whether or not the operation status is appropriate, for example.

The update section 204 controls the communication section 22 to update the recognition section 73 from the server 2, receive the update SW, develop information as necessary, or the like, thereby updating the recognition section 73 to a state relearned by the server 2.

6. Functions Implemented by Server of FIG. 4

Figure 7:
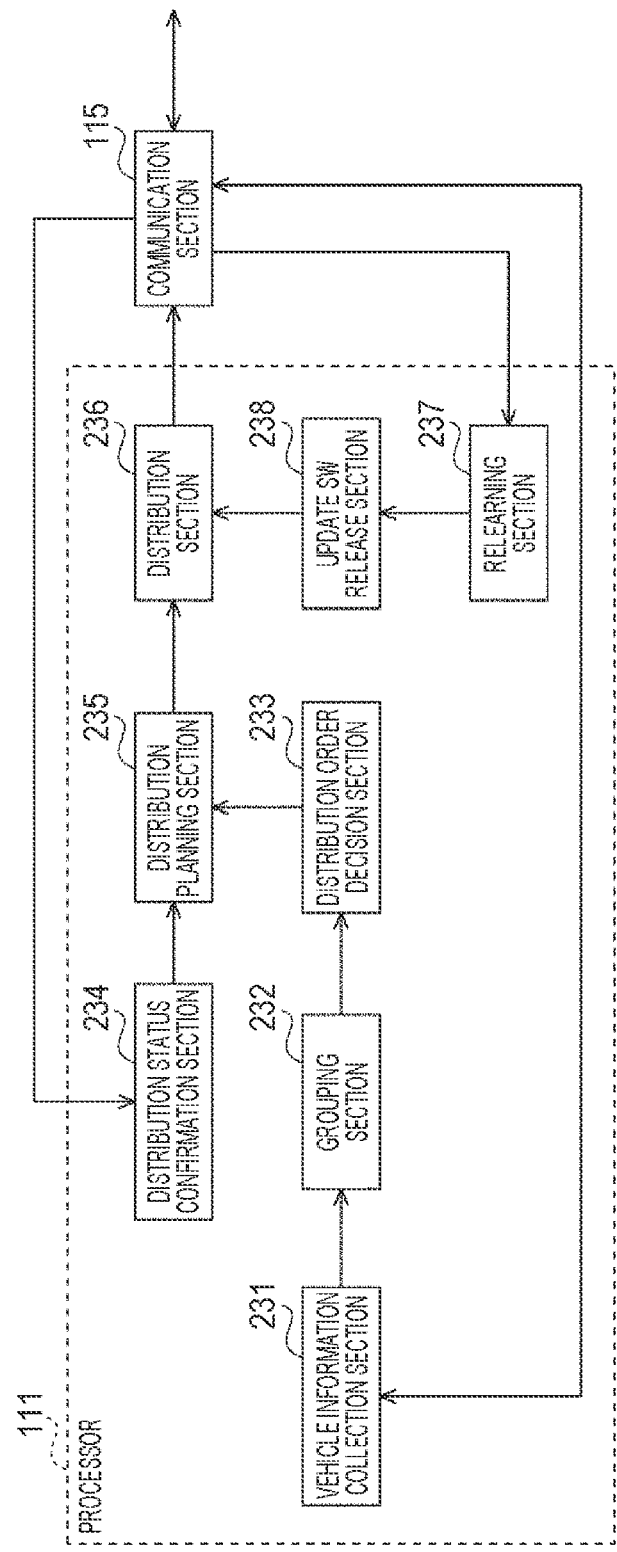
FIG. 7 is a functional block diagram illustrating functions implemented by the server of FIG. 5.

Next, functions implemented by the server 2 of FIG. 4 will be described with reference to the functional block diagram of FIG. 7.

The processor 111 of the server 2 implements functions as a vehicle information collection section 231, a grouping section 232, a distribution order decision section 233, a distribution status confirmation section 234, a distribution planning section 235, a distribution section 236, a relearning section 237, and an update SW release section 238.

The vehicle information collection section 231 controls the communication section 115 to request vehicle information for grouping the vehicles 1, collects the vehicle information, and outputs the collected vehicle information to the grouping section 232.

Here, the vehicle information is various types of information required for grouping the vehicles 1 by the grouping section 232 to be described later, and is, for example, information such as a vehicle type, position information, a detection history of the external recognition sensor 25 and a travel history including a route or the like traveled in the past, a total travel distance, weather information corresponding to the current position information of the vehicle 1, and the like.

The grouping section 232 groups the vehicles 1-1 to 1-$n$ on the basis of the vehicle information collected from each of the vehicles 1, and outputs the grouping result to the distribution order decision section 233.

The grouping performed here is to group the vehicles 1-1 to 1-$n$ into at least two groups or more for setting the order when the update SW for updating the recognition section 73 is distributed.

At the time of updating the recognition section 73, the distribution of the update SW is performed in order from a group of vehicles 1 that are not to be in a dangerous state, have a high possibility of being safe, and have ensured safety to a group with lower safety even in a state where an appropriate operation cannot be performed.

Note that the grouping will be described later in detail with reference to FIG. 8.

On the basis of the grouping result supplied from the grouping section 232, the distribution order decision section 233 decides the order of distributing the update SW in order from the group having a high possibility of being safe (safety is ensured), and outputs information on the distribution order with respect to the decided grouping result to the distribution planning section 235.

The distribution status confirmation section 234 controls the communication section 115 to confirm the distribution status indicating to which group of vehicles 1 the update SW is distributed, and outputs information of the confirmed distribution status to the distribution planning section 235.

Furthermore, the distribution status confirmation section 234 controls the communication section 115 to confirm, as the distribution status, information indicating whether or not the object recognition processing by the recognition section 73 updated by the distributed update SW is appropriate, the information being transmitted from the vehicle 1, and outputs the information to the distribution planning section 235.

The distribution planning section 235 plans the order and timing for distributing the update SW from the information on the distribution order supplied from the distribution order decision section 233 and the information on the distribution status supplied from the distribution status confirmation section 234, and outputs the order and timing to the distribution section 236 as a distribution plan.

The relearning section 237 accumulates vehicle accumulation information constituting a parameter used as relearning data including the image captured by the camera 51 and the object recognition result by the recognition section 73, supplied from the vehicle 1, relearns the corresponding recognition section 73 by using the accumulated vehicle accumulation information as relearning data, generates an update SW as a relearning result, and outputs the update SW to the update SW release section 238.

The update SW release section 238 confirms, by simulation, the operation of the recognition section 73 updated by the update SW generated by the relearning of the recognition section 73 by the relearning section 237, determines whether or not it is distributable, and outputs the distributable update SW to the distribution section 236.

The distribution section 236 controls the communication section 115 to distribute the update SW supplied from the update SW release section 238 to the vehicle 1 according to the distribution plan supplied from the distribution planning section 235, and causes the recognition section 73 to be updated.

7. Grouping of Vehicles

Next, grouping of the vehicles 1-1 to 1-n will be described with reference to FIG. 8.

The grouping of the vehicles 1-1 to 1-n by the grouping section 232 is processing for grouping a vehicle group for confirming a state of a case where the recognition section 73 is actually updated by the update SW to be distributed.

Figure 8:
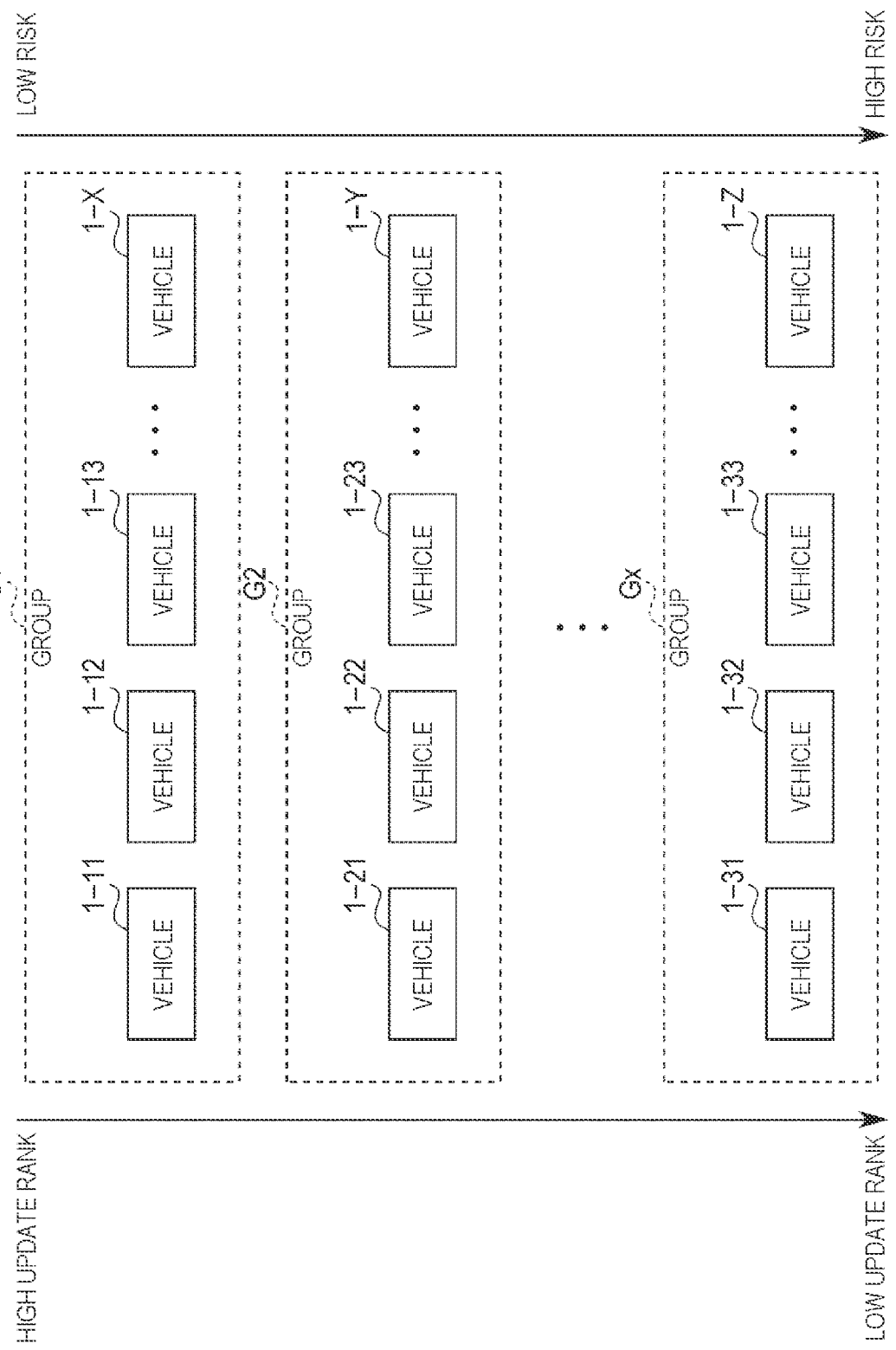
FIG. 8 is a diagram illustrating grouping of vehicles.

Therefore, the vehicles 1-1 to 1-n are desirably grouped as illustrated in FIG. 8, for example.

That is, in FIG. 8, the vehicles 1-1 to 1-n are grouped into groups G1 to Gx in order from the top.

Here, the group G1 includes vehicles 1-11 to 1-X among the vehicles 1-1 to 1-n, the group G2 includes vehicles 1-21 to 1-Y among the vehicles 1-1 to 1-n, and the group Gx includes vehicles 1-31 to 1-Z among the vehicles 1-1 to 1-n.

Furthermore, in the groups G1 to Gx in FIG. 8, the risk in a case where some defect occurs by updating the recognition section 73 by the update SW is assumed to be smaller in the upper part and larger in the lower part in the drawing.

In other words, the safest group even in a case where some defect occurs by updating the recognition section 73 the update SW is the group G1, the next safest group is the group G2, and the most dangerous group is the group Gx.

For this reason, in a case where grouping is performed as in the groups G1 to Gx as illustrated in FIG. 8, the distribution order decision section 233 decides the order of distribution of the update SW as in the groups G1, G2, . . . , Gx.

Therefore, the grouping section 232 scores the risk in a case where some defect occurs by updating the recognition section 73 by the update SW in the vehicles 1-1 to 1-n, and groups according to the score.

Hereinafter, a risk that occurs in a case where some defect occurs by updating the recognition section 73 by the update SW is referred to as an update risk.

That is, the grouping is to group the vehicles 1-1 to 1-n into a plurality of groups according to the update risk.

Therefore, in FIG. 8, an example of being divided into three or more groups is described, but ideally, it is considered that a predetermined effect can be obtained if at least two groups are obtained, that is, a group including the number of vehicles 1 in which complete safety is ensured and the influence of the update risk is likely to be stochastically obtained with a predetermined accuracy and the other groups.

That is, the update SW is first distributed to the first group including the number of vehicles 1 in which complete safety is ensured and the influence of the update risk is likely to be stochastically obtained with a predetermined accuracy, and the presence or absence of a defect when traveling using the recognition result of the recognition section 73 updated by the update SW is confirmed.

Then, when it is confirmed that there is no defect in the first group, the update SW is also distributed to the remaining groups.

Furthermore, in a case where the vehicles 1-1 to 1-n are divided into three or more groups by grouping, the update SW is distributed sequentially from the upper group, and when it is confirmed that there is no defect, the update SW is distributed sequentially to the upper group of the update risk.

In the case of being divided into three or more groups, the update SW is distributed to the group to which the update SW is distributed last in a state in which the operation status of the recognition section 73 updated by the update SW is sufficiently verified in the vehicles 1 in the groups to which the update SW is distributed so far immediately before. Therefore, vehicles 1 in a group to which the update SW is distributed later can update the recognition section 73 more safely.

For example, the grouping section 232 may regard that the update risk of encountering an accident is higher as the number of accidents or the number of automobiles in each region is larger according to the position information of the vehicles 1-1 to 1-n and the number of accidents in each region or the number of automobiles in each region.

In this case, the grouping section 232 may set scores such that the vehicle 1 in a region having a larger number of accidents or a larger number of automobiles for each region is lower, set ranks according to the scores set in this manner, and set the groups G1 to Gx from the top.

Furthermore, the grouping section 232 may set the score lower for the vehicle 1 present in a region where the recognition accuracy by object recognition is likely to deteriorate, for example, in a region where the weather is stormy, and conversely, set the score higher for the vehicle 1 present in a region where the recognition accuracy is considered to be less deteriorated, for example, in a region where the weather is fine, according to the position information of each vehicle 1 and the weather of the current location of each region, and group the vehicles 1.

Moreover, the grouping section 232 may perform grouping such that, for example, the smaller the travel distance, the lower the probability of encountering an accident and the lower the update risk, and thus the higher the score is set, and conversely, the larger the travel distance, the higher the probability of encountering an accident and the higher the update risk, and thus the higher the score is set, according to the travel distance from the operation history or the like of each vehicle 1.

Furthermore, the grouping section 232 may acquire a tendency of acceleration/deceleration, a speed range, and a driving situation of a road or the like to be used from an operation history (sensing result of the external recognition sensor 25) of each vehicle 1, and the like, and may perform grouping such that, for example, when a change in acceleration/deceleration is large, a speed range is a high speed range, or a use frequency of a road having a high accident occurrence frequency is high, the score is set low assuming that an update risk is high, and conversely, when a change in acceleration/deceleration is small, a speed range is a low speed range, or a use frequency of a road having a high accident occurrence frequency is low, the score is set high assuming that an update risk is low.

Moreover, according to the vehicle type of the vehicle 1, for example, the grouping section 232 may regard a vehicle type for which it is known that a purchaser group who prefers slow traveling purchases more than a predetermined number of vehicles, a vehicle type having a size smaller than a predetermined size, a vehicle type having traveling performance higher than a predetermined traveling performance, a vehicle type equipped with safety equipment more than a predetermined number, a commercial vehicle or the like that is traveling for commercial purposes and is known not to travel recklessly, as having a low update risk, and set the score high so as to perform grouping.

Conversely, the grouping section 232 may regard a vehicle type for which it is known that a purchaser group who prefers slow traveling purchases less than a predetermined number of vehicles, a vehicle type having a size larger than a predetermined size, a vehicle type not having traveling performance higher than a predetermined traveling performance, a vehicle type not equipped with safety equipment more than a predetermined number, a private car that may drive recklessly compared to a commercial vehicle, and the like, as having a high update risk, and set the score low so as to perform grouping. Furthermore, the grouping section 232 may group the vehicles 1 by a combination of scores in consideration of the above-described elements.

For grouping, the grouping section 232 first sets scores for the vehicles 1, then obtains ranks, and sets groups from the top with a predetermined number of divisions.

At this time, the number of vehicles 1 belonging to each group may not be equal. For example, the number of vehicles 1 belonging to a higher group may be smaller, and the number of vehicles 1 belonging to a lower group may be larger. Furthermore, the number of vehicles 1 belonging to each group may not be fixed, and for example, the width of the score belonging to each group may be determined, and the group may be set according to the score.

However, the smaller the number of vehicles 1 belonging to the group to which the update SW is first distributed, the smaller the influence of the update risk, and the easier the confirmation of the update risk.

Furthermore, since the grouping may be performed according to the level of safety, the grouping may be performed on the basis of other criteria. For example, since safety is high for vehicles for mobility as a service (MaaS), vehicles traveling in a limited area, and the like, the update SW may be distributed from these groups, and may be distributed to general vehicles after safety is confirmed.

Moreover, in a case where a passenger car is compared with a bus or the like, the bus has a larger number of occupants than the passenger car, and has a larger influence in a case where an accident occurs. Therefore, the update SW may be distributed from the passenger car, and may be distributed to the bus or the like after safety is confirmed.

Furthermore, as for the automated driving, since the driver intervenes in the driving in the case of level 2 as compared with levels 3 and 4, it is considered that a defect can be handled even if there is a defect in the update of the recognition section 73. Therefore, the update may be distributed from the vehicles 1 of level 2, and may be sequentially distributed to the vehicles of level 3 and level 4 after safety is confirmed.

8. Grouping Processing

Figure 9:
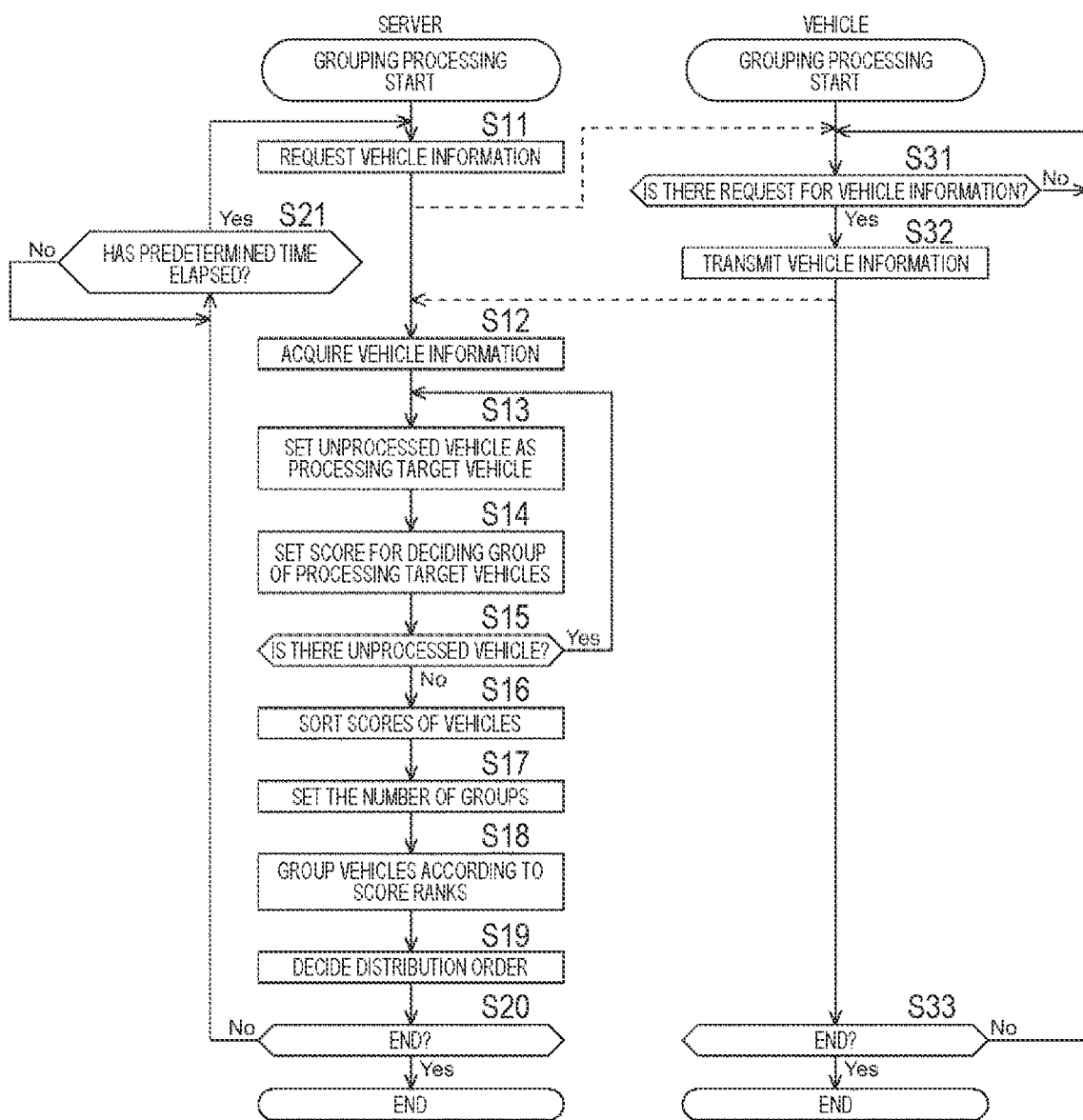
FIG. 9 is a flowchart illustrating grouping processing.

Next, the grouping processing will be described with reference to the flowchart of FIG. 9.

In step S11, the vehicle information collection section 231 controls the communication section 115 to request the vehicle information from the vehicles 1-1 to 1-n.

In step S31, the control section 201 controls the communication section 22 to determine whether or not vehicle information has been requested from the server 2, and repeats the similar processing until requested.

In a case where vehicle information is requested from the server 2 in step S31, in step S32, the control section 201 controls the communication section 22 to transmit, to the server 2, vehicle information required for grouping the vehicles 1 such as, for example, vehicle types, position information based on a GNSS signal, a detection history of the external recognition sensor 25 and a travel history including a route or the like traveled in the past, a total travel distance, weather information corresponding to current position information of the vehicle 1, and the like.

In step S33, the control section 201 determines whether or not the end of the process has been instructed, and in a case where the end of the process has not been instructed, the process returns to step S31.

That is, the processing of steps S31 to S33 is repeated until the end of the process is instructed.

Then, in step S33, when the end of the process is instructed, the process ends.

Meanwhile, when the vehicle information is transmitted to the server 2 by the processing in step S32, the vehicle information collection section 231 of the server 2 controls the communication section 115 to acquire and collect the vehicle information transmitted from the vehicle 1 in step S12.

At this time, the vehicle information collection section 231 may continuously collect each piece of the vehicle information of the vehicles 1 as a database in association with information for individually identifying the vehicles 1, for example.

Note that, here, the description will be given assuming that all the vehicle information of the vehicles 1-1 to 1-n is stored into a database by the processing of steps S12 and S32, but only some of the vehicles 1 may be compiled into a database.

In step S13, the grouping section 232 sets any unprocessed vehicle 1 among the vehicles 1-1 to 1-n stored in the database in the vehicle information collection section 231 as the processing target vehicle.

In step S14, the grouping section 232 sets a score for implementing the grouping on the basis of the vehicle information of the processing target vehicle.

That is, the grouping section 232 sets the score for each vehicle 1 on the basis of the vehicle information such that a higher score is set as the update risk (risk in a case where a defect occurs by updating the recognition section 73 by the update SW) is smaller.

In step S15, it is determined whether or not there is an unprocessed vehicle 1 for which a score necessary for grouping is not set, and in a case where there is an unprocessed vehicle 1, the process returns to step S13.

That is, the processing of steps S13 to 15 is repeated until scores for grouping are set for all the vehicles 1 for which the vehicle information is stored in the database in the vehicle information collection section 231.

Then, in step S15, in a case where it is determined that scores for grouping are set for all the vehicles 1 in which the vehicle information is stored in the database in the vehicle information collection section 231 and there is no unprocessed vehicle 1 for which a score necessary for grouping is not set, the process proceeds to step S16.

In step S16, the grouping section 232 obtains (sorts) the ranks of the vehicles 1-1 to 1-n on the basis of the obtained scores.

In step S17, the grouping section 232 sets the number of groups. Note that the number of groups may be set to a fixed value or may be dynamically set.

In step S18, the grouping section 232 groups the vehicles 1-1 to 1-n so as to have a set number of groups on the basis of the ranks according to the scores, and outputs the result to the distribution order decision section 233.

In step S19, the distribution order decision section 233 decides the distribution order in units of groups according to the scores of the groups supplied from the grouping section 232.

In step S20, the vehicle information collection section 231 determines whether or not the end of the process has been instructed, and in a case where the end of the process has not been instructed, the process proceeds to step S21.

In step S21, the vehicle information collection section 231 determines whether or not a predetermined time has elapsed, and repeats similar processing until the predetermined time has elapsed.

Then, in a case where it is determined in step S21 that the predetermined time has elapsed, the process returns to step S11, and the subsequent processing is repeated.

That is, every time a predetermined time elapses, the vehicle information is acquired from each vehicle 1, and the grouping based on the vehicle information is repeated, whereby the grouping based on fixed information such as the vehicle type of the vehicle 1 and the like and changing information around the vehicle 1 such as the position information, the weather, and the like is continuously set while changing in real time.

Then, in step S20, when the end of the process is instructed, the process ends.

That is, by the above processing, in the server 2, the grouping is repeated on the basis of the vehicle information including the fixed information of the vehicles 1 and the changing information, and the processing in which the order in which the update SW is distributed is set in units of groups of the vehicles 1 is repeated.

As a result, the vehicles 1 are grouped according to the update risk by the update SW, and the distribution order of the update SW is set for each group of the vehicles 1.

9. Relearning Processing

Figure 10:
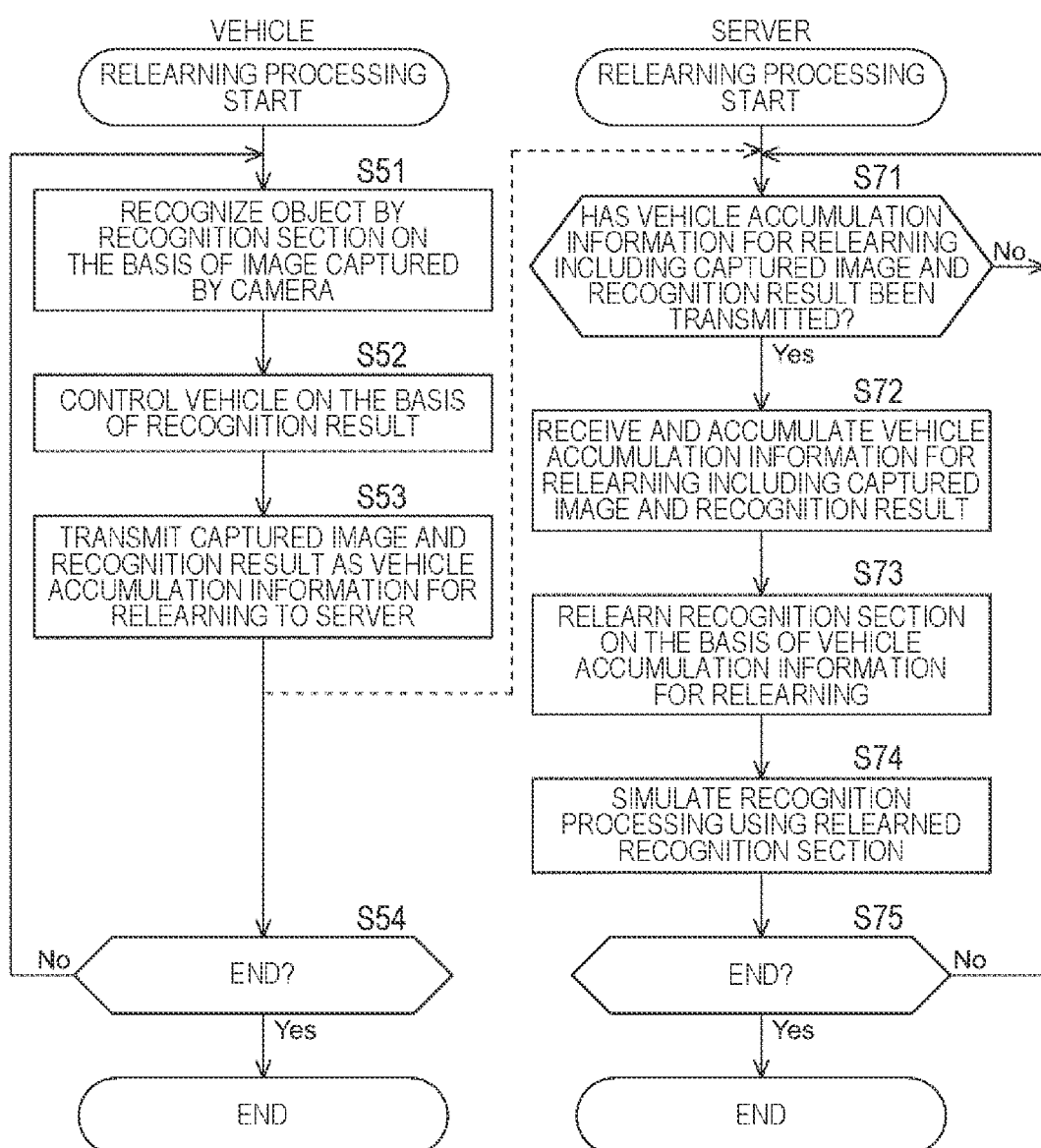
FIG. 10 is a flowchart illustrating relearning processing.

Next, relearning processing of the recognition section 73 will be described with reference to a flowchart of FIG. 10.

In step S51, the recognition section 73 of the vehicle 1 recognizes an object on the basis of the image captured by the camera 51, and outputs the object recognition result to the control section 201 together with the image.

In step S52, the control section 201 controls the vehicle control section 32 on the basis of the object recognition result to control the operation of the vehicle 1. For example, in a case where it is recognized that a pedestrian is present in front of traveling on the basis of the object recognition result, the control section 201 supplies a control signal to the vehicle control section 32 to perform control so as to perform an operation of avoiding contact with the pedestrian.

In step S53, the control section 201 controls the communication section 22 to accumulate the object recognition result of the recognition section 73 and the image of the camera 51 at that time together as vehicle accumulation information and transmit the accumulated information to the server 2. At this time, for example, the control section 201 may transmit an identifier for identifying the vehicle 1 and other vehicle information to the server 2.

In step S71, the relearning section 237 of the server 2 controls the communication section 115 to determine whether or not the vehicle accumulation information in which the object recognition result of the recognition section 73 and the image of the camera 51 at that time are combined has been transmitted.

In a case where it is determined in step S71 that the vehicle accumulation information in which the object recognition result of the recognition section 73 and the image of the camera 51 at that time are combined has not been transmitted, the process proceeds to step S75.

Meanwhile, in a case where it is determined in step S71 that the vehicle accumulation information in which the object recognition result of the recognition section 73 and the image of the camera 51 at that time are combined has been transmitted, the process proceeds to step S72.

In step S72, the relearning section 237 receives and accumulates the transmitted object recognition result of the recognition section 73 and the image of the camera 51 at that time together as vehicle accumulation information for relearning.

At this time, in a case where an identifier for identifying the vehicle 1 or other vehicle accumulation information is transmitted, the relearning section 237 receives and accumulates the identifier and the other vehicle accumulation information together.

Note that, here, the description will proceed on the assumption that the vehicle accumulation information for relearning is received and accumulated from all the vehicles 1 by the processing of steps S71 and S72, but the vehicle accumulation information may be partially provided.

In step S73, the relearning section 237 relearns the recognition section 73 by using the accumulated vehicle accumulation information for relearning, and supplies a relearning result to the update SW release section 238.

In step S74, the update SW release section 238 executes a simulation using the relearned recognition section 73 to verify the recognition accuracy.

In step S75, the relearning section 237 determines whether or not the end of the process has been instructed, and in a case where the end of the process has not been instructed, the process returns to step S71, and the subsequent processing is repeated.

That is, until the end of the process is instructed, the vehicle accumulation information for relearning including the recognition result of the recognition section 73 and the image is collected from the vehicle 1, the relearning is repeated, and the processing in which the recognition accuracy of the recognition section 73 subjected to the relearning is obtained by simulation is repeated.

Then, in step S75, when the end of the process is instructed, the process ends.

With the above processing, the vehicle accumulation information for relearning including the recognition result of the recognition section 73 and the image is collected from the vehicle 1, the relearning is repeated, and the processing in which the recognition accuracy of the recognition section 73 subjected to the relearning is obtained by simulation can be repeated.

10. Update Processing

Next, update processing will be described with reference to the flowchart of FIG. 11.

In step S91, the update SW release section 238 determines whether or not to distribute the update SW and set that there is an update on the basis of whether or not the relearned recognition section 73 obtained by the relearning processing described above is in the state to be distributed, and repeats the similar processing until it is determined that there is an update.

For example, in a case where the recognition accuracy of the relearned recognition section 73 is improved by a predetermined ratio from the recognition accuracy of the recognition section 73 before relearning, the update SW release section 238 may determine that it is in the state to be updated.

In step S91, in a case where the update SW release section 238 determines that it is in the state to be updated by the relearned recognition section 73, the process proceeds to step S92.

In step S92, the distribution planning section 235 initializes a counter i of an identifier for identifying the grouped group to 1.

In step S93, the distribution planning section 235 acquires the vehicle information of the vehicles 1 belonging to the group i among the information of the distribution order in units of groups decided by the distribution order decision section 233.

For example, in the case of the first processing in which the counter i=1, even if there is a defect in the update of the recognition sections 73 belonging to the group G1 to which the update SW is first distributed, described with reference to FIG. 8, the vehicle information of the group of vehicles 1 in which the safety is ensured is acquired.

In step S94, the distribution planning section 235 sets an unprocessed vehicle 1 among the vehicles 1 belonging to the group i as the processing target vehicle.

In step S95, the distribution planning section 235 executes distribution timing setting processing, and sets the update timing of the recognition section 73 of the processing target vehicle by the update SW.

In updating the recognition section 73 by distributing the update SW, since the operation of the recognition section 73 being updated is stopped, the timing at which the movement of the vehicle 1 is stopped or the timing at which the recognition processing by the recognition section 73 related to the update is unnecessary is set as the timing at which the update SW is distributed.

Figure 12:
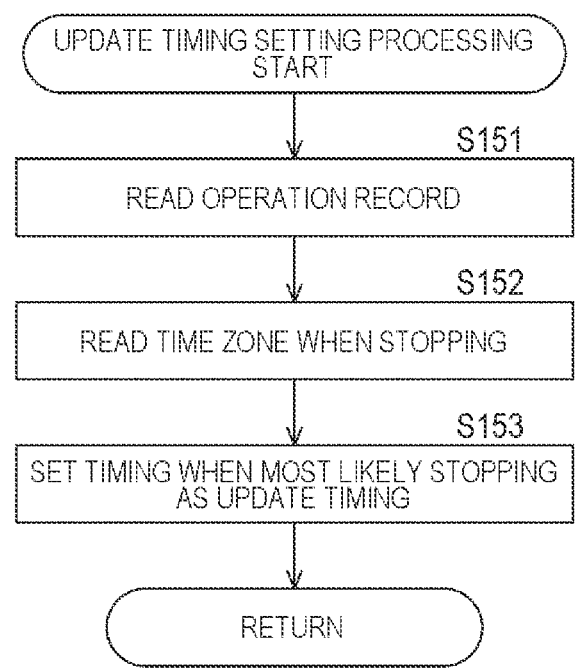
FIG. 12 is a flowchart illustrating update timing setting processing (part 1).
Figure 13:
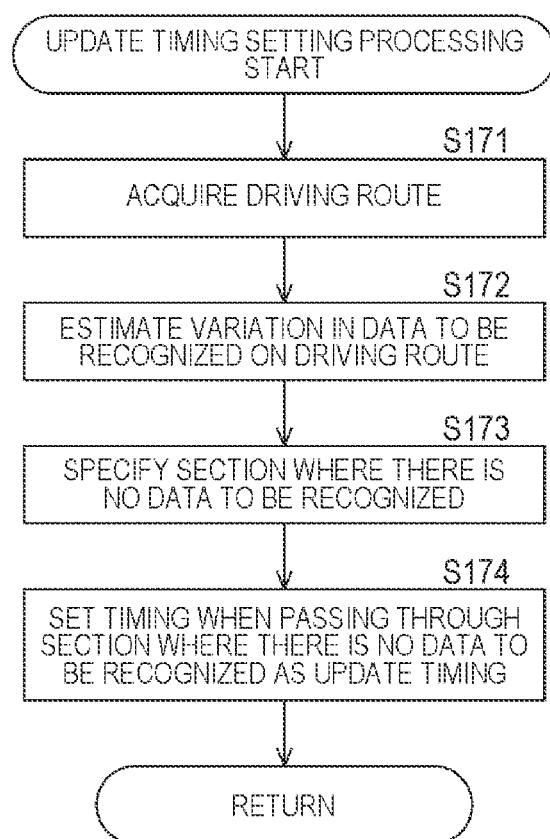
FIG. 13 is a flowchart illustrating update timing setting processing (part 2).

Note that details of the distribution timing setting processing will be described later with reference to the flowcharts of FIGS. 12 and 13.

In step S96, the distribution planning section 235 determines whether or not there is an unprocessed vehicle 1 in which the distribution timing is not set among the vehicles 1 belonging to the group i, and in a case where there is an unprocessed vehicle 1, the process returns to step S94.

That is, the processing of steps S94 to S96 is repeated until the distribution timing is set for all the vehicles 1 belonging to the group i.

Then, in a case where it is determined in step S96 that the distribution timing has been set for all the vehicles 1 belonging to the group i, the process proceeds to step S97.

That is, at this time point, all the distribution timings of the vehicles 1 belonging to the group i are planned, whereby the distribution plan of the update SW is completed.

In step S97, the distribution planning section 235 determines whether or not the distribution timing of any vehicle 1 belonging to the group i has come on the basis of the distribution plan.

In a case where it is determined in step S97 that the distribution timing of any vehicle 1 belonging to the group i has come on the basis of the distribution plan, the process proceeds to step S98. Note that, in step S97, in a case where it is not any distribution timing of the vehicles 1 belonging to the group i, the process proceeds to step S103.

In step S98, the distribution planning section 235 controls the distribution section 236 to acquire the update SW supplied from the update SW release section 238 to update the recognition section 73 generated by relearning, and causes the communication section 115 to distribute the update SW to the vehicle 1 at the distribution timing.

At this time, the distribution status confirmation section 234 controls the communication section 115 to acquire the distributed version of the update SW and the information of the vehicle 1 to be the distribution destination as the distribution status.

In step S121, the update section 204 of the vehicle 1 controls the communication section 22 to determine whether or not the update SW is transmitted from the server 2.

In the case of the vehicle 1 belonging to the group i at the distribution timing, it is determined in step S121 that the update SW is transmitted from the server 2, and the process proceeds to step S122.

In step S122, the update section 204 stops at least one of the operation related to the object recognition processing of the recognition section 73 or the operation control based on the recognition result of the recognition section 73 in the control section 201.

In step S123, the update section 204 controls the communication section 22 to acquire the transmitted update SW and updates the recognition section 73. At this time, before performing the update by the update SW, the update section 204 holds the recognition section 73 before the update for backup.

In step S124, the update section 204 operates the recognition section 73 on a trial basis, confirms the operating state, and confirms that the update by the update SW has been appropriately completed.

Here, in a case where the update by the update SW is not completed, the update section 204 repeats the update by the update SW until the update is appropriately completed, and completes the update in an appropriate state.

At this time point, in a case where the update cannot be appropriately completed, the update section 204 ends the update processing and operates the recognition section 73 before the update held as a backup again.

In step S125, after the update by the update SW is completed, the recognition section 73 recognizes an object on the basis of the image captured by the camera 51, and outputs the recognition result to the operation status recognition section 202.

In step S126, the operation status recognition section 202 acquires the image captured by the camera 51 and the object recognition result of the recognition section 73 corresponding to the image captured by the camera 51.

In step S127, the operation status recognition section 202 determines whether or not the operation status of the recognition section 73 is appropriate on the basis of the acquired object recognition result, and outputs the determination result to the operation status reporting section 203 in association with the object recognition result and the image.

That is, for example, the operation status recognition section 202 specifies an object that can be recognized from the map information corresponding to the current position information on the basis of the map information of the map information accumulation section 23 and the position information based on the signals from the GNSS reception section 24 and the external recognition sensor 25, in addition to the image captured by the camera 51 and the object recognition result of the recognition section 73 based on the image captured by the camera 51, and determines whether or not the recognition section 73 is appropriately operating by comparison with the object recognition result.

In step S128, the operation status reporting section 203 determines whether or not reporting of the operation status is necessary. That is, the necessity of the reporting of the operation status is, for example, a case where the operation state is inappropriate. However, the necessity of the reporting of the operation status may be any case where the operation status is required regardless of whether or not the operation status is appropriate.

In a case where it is determined in step S128 that the reporting of the operation status is necessary, the process proceeds to step S129.

In step S129, the operation status reporting section 203 controls the communication section 22 to report the operation status to the server 2.

Note that, in a case where it is determined in step S128 that reporting of the operation status is unnecessary, the processing of step S129 is skipped.

In step S130, the operation status recognition section 202 determines whether or not the determination of the operation status of the recognition section 73 after the update is sufficient, and in a case where it is determined that the determination is not sufficient, the process returns to step S124.

That is, the processing of steps S125 to S130 is repeated until it is determined that the determination of the operation status of the recognition section 73 after the update is sufficient.

Note that the determination as to whether or not the determination of the operation status of the recognition section 73 after the update is sufficient may be made, for example, by determining whether or not the operation status has been recognized a predetermined number of times or more.

In a case where it is determined in step S130 that the determination of the operation status of the recognition section 73 after the update is sufficient, the process proceeds to step S131.

In step S131, the update section 204 determines whether or not the update of the recognition section 73 by the update SW is appropriate.

That is, since it is the timing after it is determined that the determination of the operation status of the recognition section 73 after the update is sufficient in the immediately preceding processing, the update section 204 may determine whether or not the update of the recognition section 73 by the update SW is appropriate on the basis of, for example, whether or not the ratio of the number of times the operation status is recognized to be inappropriate is higher than a predetermined ratio with respect to the predetermined number of times the operation status of the operation status recognition section 202 is recognized.

In a case where it is determined in step S131 that the update of the recognition section 73 by the update SW is appropriate, the process proceeds to step S132.

In step S132, the update section 204 resumes the operation related to the object recognition processing of the recognition section 73 after the update and the operation control based on the recognition result of the recognition section 73 after the update in the control section 201. At this time, the update section 204 discards the recognition section 73 before update held for backup.

In a case where it is determined in step S131 that the update of the recognition section 73 by the update SW is not appropriate, the process proceeds to step S133.

In step S133, the update section 204 returns the operation to the state of the recognition section 73 before update held for backup, and resumes the operation related to the object recognition processing of the recognition section 73 before update and the operation control based on the recognition result of the recognition section 73 before update in the control section 201. That is, in this case, the recognition section 73 is not updated, and the operation in the state before the update is continued.

That is, in this case, since the update by the update SW of the recognition section 73 is not appropriate, it is considered that the reliability of the recognition result of the recognition section 73 after the update is low. For this reason, if the processing based on the recognition result of the recognition section 73 after the update is performed, there is a possibility that erroneous processing based on erroneous detection is performed and dangerous operation is caused. Therefore, the operation is returned to the operation based on the recognition result of the recognition section 73 before the update.

Furthermore, in a case where it is determined that the update of the recognition section 73 by the update SW is not appropriate, instead of the processing of step S133, a state may be made in which the processing based on the recognition result of the recognition section 73 after the update by the update SW is not performed in the control section 201.

At this time, since the update of the recognition section 73 by the update SW is in an inappropriate state and the reliability of the operation control based on the recognition result is low, the driver who is the user may be allowed to recognize that the operation such as the automated driving or the like using the recognition result of the recognition section 73 is stopped.

In step S134, it is determined whether or not the end of the process has been instructed, and in a case where the end of the process has not been instructed, the process returns to step S121.

That is, when the processing of steps S121 to S134 is repeated and the update SW is distributed until the end of the process is instructed, the stop of the operation by the recognition section 73, the update of the recognition section 73, and the recognition of the operation status of the recognition section 73 are repeated, and the process of reporting the operation status to the server 2 is repeated as necessary.

Meanwhile, in step S99, the distribution status confirmation section 234 of the server 2 controls the communication section 115 to determine whether or not there is a report of the operation status of the recognition section 73 updated by the update SW from any one of the vehicles 1, and in a case where there is the report of the operation status, the process proceeds to step S100. Note that, in a case where there is no report of the operation status of the recognition section 73 updated by the update SW from any vehicle 1 in step S99, the process proceeds to step S103.

In step S100, the distribution status confirmation section 234 acquires information on the operation status of the recognition section 73 updated by the reported update SW.

In step S101, the distribution status confirmation section 234 aggregates the information of the operation status of the recognition section 73 updated by the reported update SW. More specifically, the distribution status confirmation section 234 aggregates, for example, the rate at which the recognition processing of the recognition section 73 updated by the update SW is regarded as inappropriate.

In step S102, the distribution status confirmation section 234 determines whether or not the update of the recognition section 73 by the update SW is inappropriate on the basis of the aggregated result.

More specifically, for example, the distribution status confirmation section 234 determines whether or not the update of the recognition section 73 by the update SW is inappropriate according to whether or not the rate at which the recognition processing of the recognition section 73 updated by the update SW is regarded as inappropriate is higher than a predetermined rate.

In a case where it is not determined in step S102 that the update of the recognition section 73 by the update SW is inappropriate, the process proceeds to step S103.

In step S103, the distribution status confirmation section 234 determines whether or not the update SW is distributed and the recognition section 73 is updated in all the vehicles 1 of the group i.

In step S103, in a case where the update SW is not distributed and the recognition section 73 is not updated in all the vehicles 1 in the group i, the process returns to step S97.

That is, the processing of steps S97 to S103 is repeated until the update SW is distributed and the recognition section 73 is updated in all the vehicles 1 in the group i.

Then, in step S103, in a case where it is determined that the update SW is distributed and the recognition section 73 is updated in all the vehicles 1 in the group i, the process proceeds to step S104.

In step S104, the distribution planning section 235 increments the counter i by 1.

In step S105, the distribution planning section 235 determines whether or not the counter i is larger than the maximum value which is the number of groups, and the update processing has been completed for all the groups.

In step S105, in a case where it is determined that the counter i is equal to or less than the maximum value which is the number of groups, and the update processing is not completed for all the groups, the process returns to step S93, and the subsequent processing is repeated.

That is, the processing of distributing the update SW in units of groups and updating the recognition section 73 is repeated in order from each vehicle 1 in the group with high safety in a case where there is a defect in the updated recognition section 73, and the processing of steps S93 to S105 is repeated until the recognition section 73 is updated by the update SW for the vehicles 1 in the all groups.

Then, in step S105, in a case where it is determined that the counter i is larger than the maximum value which is the number of groups and the processing has been completed for all the groups, the process proceeds to step S106.

In step S106, it is determined whether or not the end of the process has been instructed, and in a case where the end of the process has not been instructed, the process returns to step S91, and the subsequent processing is repeated.

Then, in a case where the end of the process is instructed in step S106, the process ends.

Furthermore, in step S102, in a case where it is determined that the update of the recognition section 73 by the update SW is inappropriate, the process proceeds to step S107.

In step S107, since it has been confirmed that a defect occurs in the update of the recognition section 73 by the current update SW, the distribution status confirmation section 234 notifies the distribution planning section 235 that the subsequent distribution of the update SW is stopped.

As a result, the distribution planning section 235 discards the distribution plan and stops the subsequent distribution of the update SW of the group i.

According to the above processing, when it is regarded that the recognition section 73 needs to be updated by the update SW obtained by relearning, the update SW is distributed in order from the group having a lower update risk for each group of vehicles 1, and the operation status is confirmed. When it is regarded that the recognition processing is appropriate by the recognition section 73 after the update on the basis of the operation status, it is possible to sequentially and stepwise distribute the update SW to the vehicles 1 of the group having a higher update risk to update the recognition section 73.

As a result, since the distribution of the update SW of the recognition section 73 is sequentially performed from the group of the vehicles 1 having a lower update risk, even if a defect is recognized from the operation status of the recognition section 73 after the update, it is possible to safely update the recognition section 73 while suppressing occurrence of a fatal problem due to erroneous recognition.

Furthermore, even in a state where complete relearning is not performed, the recognition section 73 is updated by the update SW in order from the vehicle 1 having a lower update risk, and the distribution of the update SW can be gradually spread to the vehicle 1 of the group having a higher update risk while confirming the operation status. As a result, it is possible to reduce the temporal cost related to relearning, and it is possible to quickly distribute the update SW.

As a result, it is possible to quickly and safely update the SW such as the recognition section 73 by the update SW or the like.

11. Update Timing Setting Processing (Part 1)

Next, update timing setting processing (part 1) of FIG. 11 will be described with reference to the flowchart of FIG. 12.

In step S151, the distribution planning section 235 reads the vehicle information of the vehicle 1 included in the information of the distribution order decided by the distribution order decision section 233, and reads the operation record of the processing target vehicle. The operation record here is, for example, a daily operation time zone of the vehicle 1 or the like.

In step S152, the distribution planning section 235 estimates a time zone during which the processing target vehicle is stopped on the basis of the read operation record of the processing target vehicle.

In step S153, the distribution planning section 235 sets, as the distribution timing, the timing at which the processing target vehicle is most likely to be stopped in the time zone in which the processing target vehicle is stopped.

That is, according to the above processing, it is possible to set, as the update timing of the recognition section 73 by the update SW, the safe timing in which the recognition section 73 is most likely to be stopped from the operation record even if it gets in a state of being unable to function with the update.

Note that, in addition to this, a time zone in which the vehicle is likely to be in the stop state such as night or the like may be set.

12. Update Timing Setting Processing (Part 2)

Next, the update timing setting processing (part 2) of FIG. 11 will be described with reference to the flowchart of FIG. 13.

In the above, an example has been described in which the timing at which the vehicle 1 is most likely to be stopped from the operation record is set as the update timing. However, since the users of the vehicles 1 used for car sharing and the like are not the same, there is a possibility that the timing at which the vehicle 1 is stopped is difficult to estimate from the operation record and the update timing cannot be appropriately set. Furthermore, in the case of the vehicle 1 used for delivery or the like, there is a possibility that the stop timing is originally little.

Therefore, by setting a timing at which a recognition target of the recognition section 73 is unlikely to be recognized as the update timing, the timing at which the influence is smaller even if the recognition section 73 does not function during the update processing may be set as the update timing.

For example, when the recognition target of the recognition section 73 is only a pedestrian and a pedestrian is to be recognized, for example, a pedestrian is not recognized, for example, during traveling on a highway or the like when the control section 201 controls the operation so as to avoid contact with a pedestrian. Therefore, the operation to avoid contact with a pedestrian is not required.

Therefore, on the basis of the operation record or the driving route planning, a timing at which it is estimated that a recognition target to be recognized by the recognition section 73 is not to be detected and at which there is no problem even if the recognition function by the recognition section 73 is stopped may be set as the update timing.

Therefore, in the update timing setting processing (part 2), processing will be described in which, in a case where the recognition target of the recognition section 73 is only a pedestrian, a timing at which there is a low possibility that a pedestrian is to be detected by the recognition section 73 such as on a highway or the like on the basis of the driving route planning and there is no problem even if the recognition function of the recognition section 73 is stopped is set as the update timing.

In step S171, the distribution planning section 235 acquires information on the driving route planned by the action planning section 62.

In step S172, the distribution planning section 235 estimates a variation in data to be recognized on the driving route on the basis of the acquired information of the driving route.

That is, for example, in a case where the recognition target is a pedestrian, when the processing target vehicle moves on the planned driving route, the distribution planning section 235 estimates a position on the driving route where (there is a high possibility that) there is no data recognized as a pedestrian by the recognition section 73 on the basis of the image captured by the camera 51.

In step S173, the distribution planning section 235 specifies a section on the driving route where (there is a high possibility that) there is no data to be recognized on the basis of the information on the variation of the data to be recognized on the estimated driving route.

That is, in a case where the recognition target is a pedestrian, the distribution planning section 235 specifies a section in which (there is a high possibility that) there is no data of a pedestrian on the planned driving route. On the planned driving route, a section in which there is no data of a pedestrian is, for example, on a highway, an automobile exclusive road, or the like.

In step S174, the distribution planning section 235 sets, as the update timing, a timing at which the vehicle passes through a section in which (there is a high possibility that) there is no data to be recognized on the estimated driving route.

That is, in this case, a timing at which the vehicle passes through a section in which (there is a high possibility that) there is no data of a pedestrian on the planned driving route, for example, a timing at which the vehicle travels on a highway or the like is set as the update timing.

By setting the update timing in this manner, when the recognition section 73 is updated by the update SW is a timing at which a pedestrian is not to be recognized since the vehicle is traveling on the highway during the update, and a state in which a malfunction caused by erroneous recognition such as recognition of a pedestrian does not occur even if the operation based on the recognition result of the recognition section 73 is stopped, that is, even if the function of recognizing a pedestrian is stopped. Therefore, it is possible to safely implement the update of the recognition section 73.

Note that, regarding the update of the recognition section 73 that executes the object recognition processing on the basis of the image captured by the rear camera, there is no problem even if the object recognition processing is stopped as long as it is the timing of forward travel, and thus, the update timing may be set during forward travel.

Furthermore, in the above description, the example in which the server 2 sets the update timing has been described, but the update timing may be set by the vehicle 1.

That is, in this case, the update section 204 of the vehicle 1 executes the update timing setting processing described with reference to the flowcharts of FIGS. 12 and 13 on the basis of the operation status, and sets the update timing between steps S31 and S32 in the grouping processing described with reference to the flowchart of FIG. 9, for example. Then, in the processing of step S32, the control section 201 controls the communication section 22 to include the information of the update timing in the vehicle information and transmit the information to the server 2.

Furthermore, in the update processing described with reference to the flowchart of FIG. 11, since the update timing has already been set on the vehicle 1 side in the grouping processing, the processing of steps S94 to S96 is skipped, and the update SW is distributed from the server 2 at the update timing set on the vehicle 1 side.

13. Update for Each Processing Unit

<Update in Component Unit>

In the above description, regarding the update of the recognition section 73, an example has been described in which the operation by the recognition section 73 is stopped and the recognition section is updated by the update SW. However, the recognition section 73 may be updated by the update SW during the operation in which the recognition processing is performed.

The recognition processing by the recognition section 73 is processed in time series in units of components. The component indicates, for example, recognition processing for each recognition target, and is set, for example, for each recognition target such as recognizing a railroad crossing, recognizing a signal, and recognizing a pedestrian. Therefore, in the object recognition processing by the recognition section 73, it can be considered that the object recognition processing in units of components having different recognition targets is sequentially executed in time series.

Figure 14:
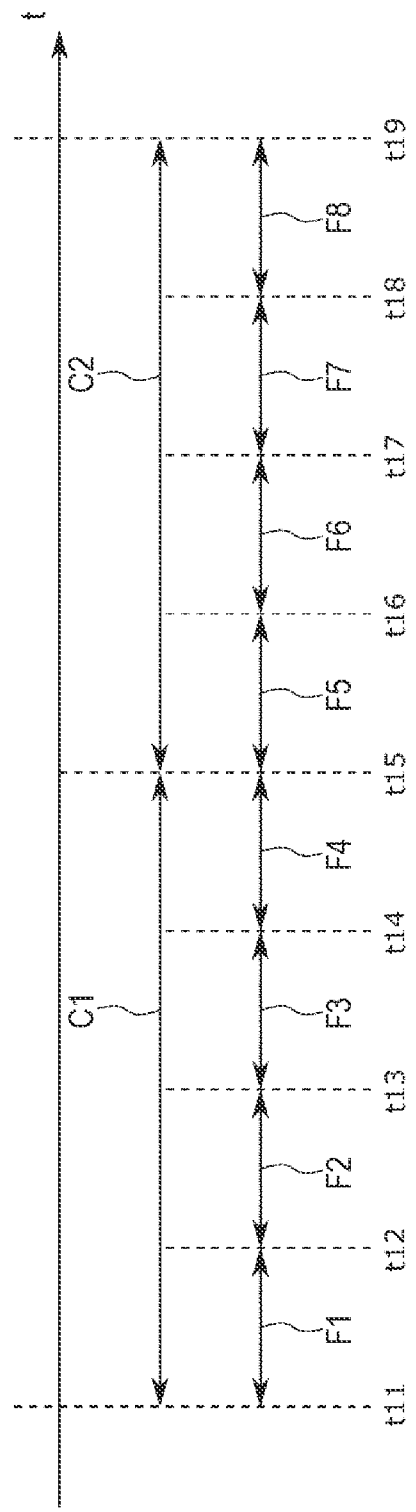
FIG. 14 is a diagram illustrating update processing using a component as a processing unit.

That is, for example, as illustrated in FIG. 14, a case where the components C1 and C2 are executed in time series will be considered. In FIG. 14, the processing of the component C1 is performed at times t11 to t15, and the processing of the component C2 is performed at times t15 to t19.

Furthermore, the processing of each component is performed in units of frames of an image captured by the camera 51.

That is, in the processing of the component C1 in FIG. 14, it is illustrated that the processing of the frame F1 is performed at times t11 to t12, the processing of the frame F2 is performed at times t12 to t13, the processing of the frame F3 is performed at times t13 to t14, and the processing of the frame F4 is performed at times t14 to t15.

Furthermore, in the processing of the component C2 in FIG. 14, it is illustrated that the processing of the frame F5 is performed at times t15 to t16, the processing of the frame F6 is performed at times t16 to t17, the processing of the frame F7 is performed at times t17 to t18, and the processing of the frame F8 is performed at times t18 to t19.

Note that, in FIG. 14, an example of processing for four frames is illustrated in each of the components C1 and C2, but processing for other number of frames may be performed, or the number of frames may not be the same for each component.

In a case where the component C1 is object recognition processing for recognizing a railroad crossing, for example, when the vehicle is traveling on a highway, there is no railroad crossing, and no railroad crossing is detected as a recognition result. Therefore, the object recognition processing of the component C1 is substantially unnecessary.

For this reason, even if the accuracy of the recognition result of the component C1 is extremely lowered, a malfunction due to the recognition result does not occur.

Therefore, for the component C1 that recognizes a railroad crossing, there is no problem even if the update processing of the recognition section 73 by the update SW is performed without stopping the operation of the object recognition processing of the component C1 (or the operation control of the control section 201 based on the recognition result of the recognition section 73) as long as the vehicle is traveling on a highway where there is no railroad crossing.

For this reason, at the timing when the recognition target is not recognized (the possibility of recognition is extremely low), the recognition section 73 may be updated by the update SW in units of components without stopping the operation of the recognition section 73.

<Update Between Frames>

Moreover, in each frame, imaging processing, transfer processing, and recognition processing are performed in time series.

Figure 15:
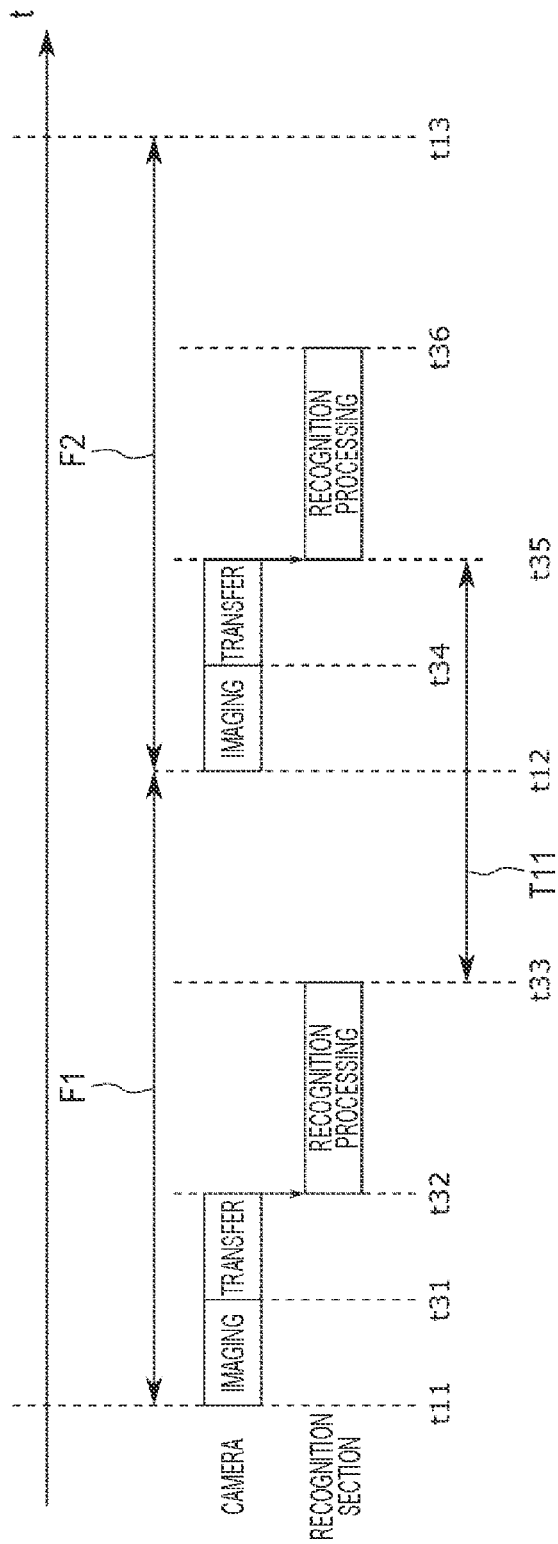
FIG. 15 is a diagram illustrating update processing using a frame as a processing unit.

That is, for example, in the frames F1 and F2, as illustrated in FIG. 15, imaging processing is performed by the camera 51 at times t11 to t31, transfer processing of imaging data is performed by the camera 51 at times t31 to t32, and recognition processing is performed by the recognition section 73 at times t32 to t33.

Furthermore, in the frame F2, imaging processing is performed by the camera 51 at times t12 to t34, transfer processing of imaging data is performed by the camera 51 at times t34 to t35, and recognition processing is performed by the recognition section 73 at times t35 to t36.

For this reason, in the series of recognition processing, since the operation is substantially stopped at the timing when the recognition processing by the recognition section 73 is not actually performed, the operation control based on the recognition result is not affected even if the recognition section 73 is updated by the update SW.

Therefore, as illustrated in FIG. 15, since the processing of the recognition section 73 is not performed in a period T11 from the timing of time t33 at which the recognition processing of the recognition section 73 of the frame F1 ends to the timing of time t35 at which the recognition processing of the recognition section 73 of the frame F2 starts, the period is a timing at which the update can be performed.

As described above, while the series of recognition processing is continued, the update timing may be set such that the recognition section 73 is updated by the update SW at the timing between the frames in which the recognition section 73 does not actually function.

<Update in Processing Block Unit>

Furthermore, since the recognition processing by the recognition section 73 includes a plurality of processing blocks, the update may be performed in units of processing blocks by the update SW at a timing between blocks where the processing is not performed in units of processing blocks.

Figure 16:
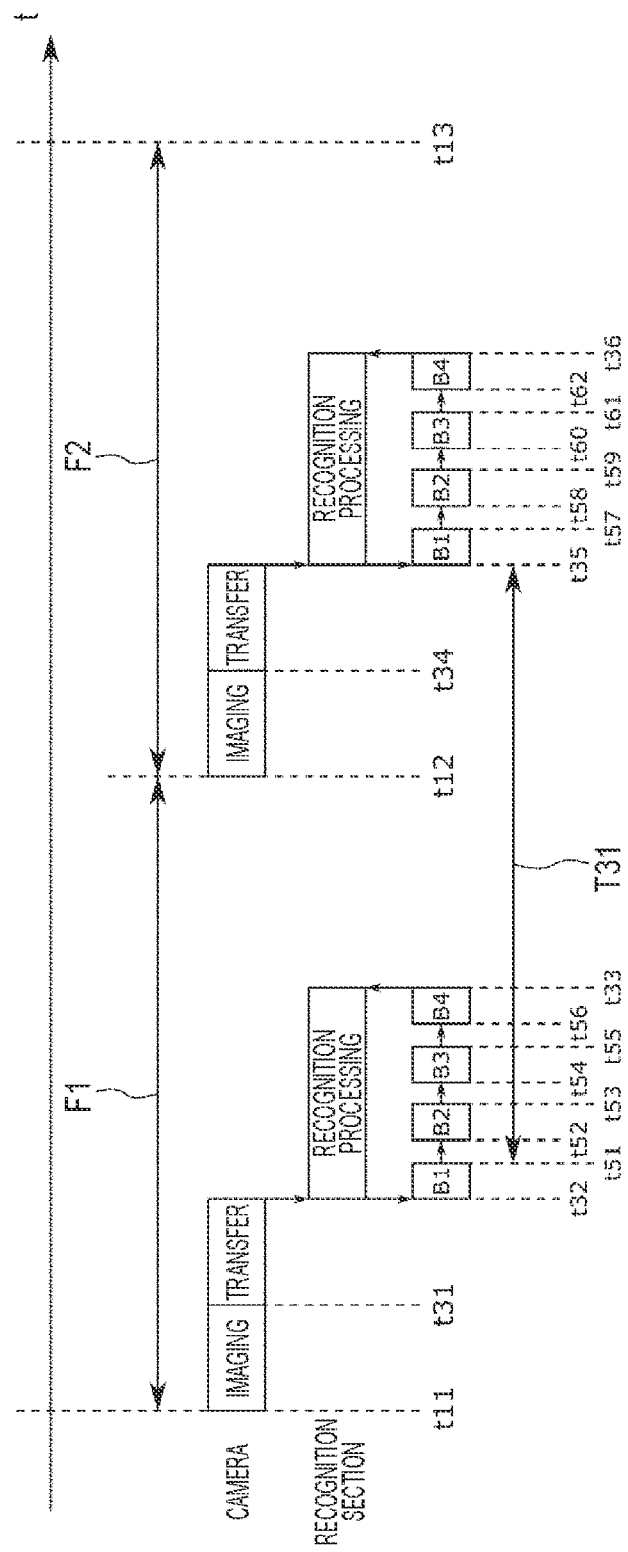
FIG. 16 is a diagram illustrating update processing using a block as a processing unit.

That is, for example, as illustrated in FIG. 16, in a case where the recognition processing of the frame F1 by the recognition section 73 includes processing blocks B1 to B4, processing of the processing block B1 is performed at times t32 to t51, processing of the processing block B2 is performed at times t52 to t53, processing of the processing block B3 is performed at times t54 to t55, and processing of the processing block B4 is performed at times t56 to t33.

Furthermore, in the recognition processing of the frame F2 by the recognition section 73, the processing of the processing block B1 is performed at times t35 to t57, the processing of the processing block B2 is performed at times t58 to t59, the processing of the processing block B3 is performed at times t60 to t61, and the processing of the processing block B4 is performed at times t62 to t36.

In this case, since the processing of the processing block B1 is not performed in a period T31 from time t51 when the processing of the processing block B1 of the frame F1 ends to when the processing of the processing block B1 of the frame F2 starts, the operation of the processing block B1 is substantially stopped, and thus, the period is a timing at which the update can be performed.

As described above, while the series of recognition processing is continued, the recognition section 73 may be updated in units of processing blocks by the update SW at the timing between the processing blocks in which the recognition section 73 does not actually function.

<Update in Layer Unit>

In a case where each of the processing blocks constituting the recognition processing of the recognition section 73 is constituted by a neural network, updating may be performed in units of specific layers in the processing block.

Figure 17:
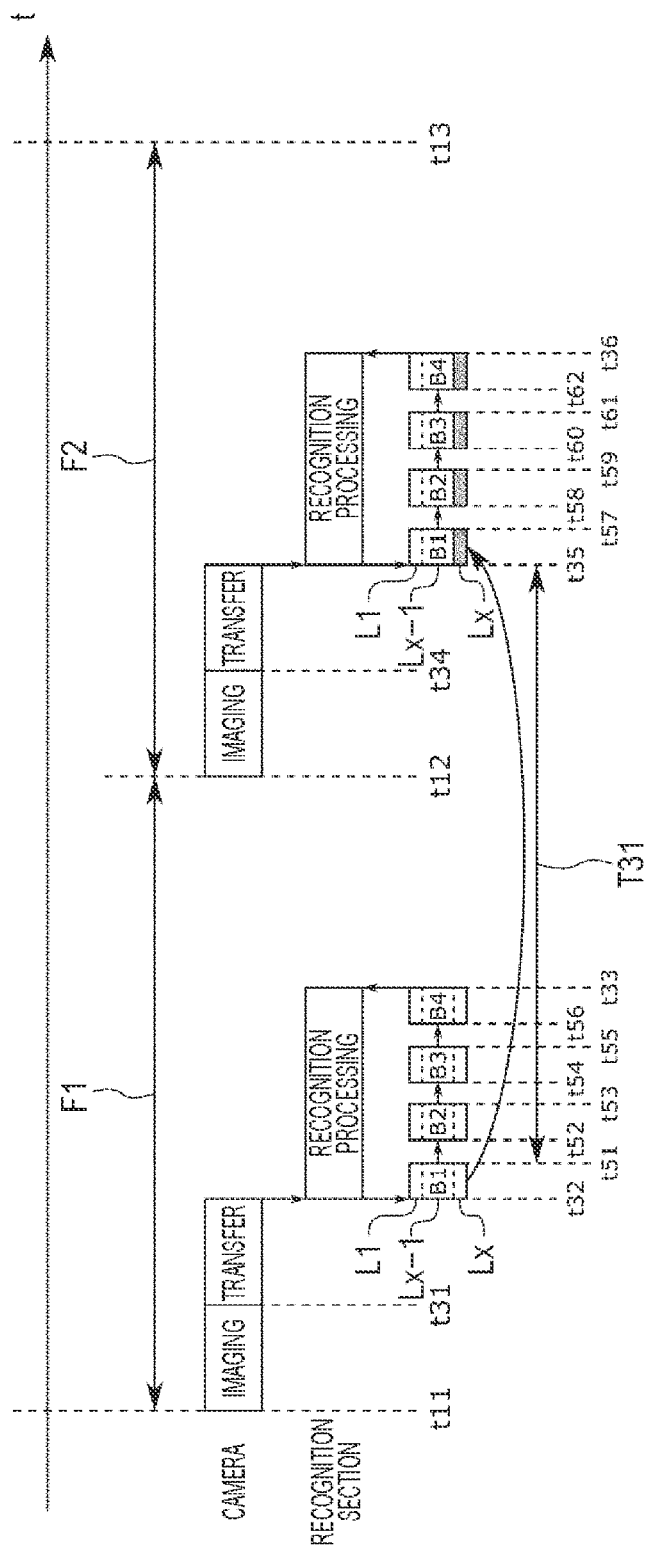
FIG. 17 is a diagram illustrating update processing using a layer as a processing unit.

That is, as illustrated in FIG. 17, update of the processing block B1 is considered in a case where each of the processing blocks B1 to B4 is constituted by, for example, a neural network including layers L1 to Lx.

In this case, in the case of the processing block B1, as illustrated in FIG. 17, the layer Lx of the processing block B1 may be updated in units of layers at the first timing in the period T31 similar to the updatable timing between the processing blocks, and thereafter, may be sequentially updated in units of layers, such as the layers Lx-1, Lx-2, . . . , L1, at similar timing. Note that, although FIG. 17 illustrates an example in which the update by the update SW is performed in units of one layer, the update by the update SW may be performed in units of a plurality of layers.

In the case of the processing block constituted by the neural network, the update by the update SW may be further performed in units of channels in the layer. In this case, the update may be performed in units of one channel or in units of a plurality of channels.

Furthermore, in this case, since the update is performed in units of layers or in units of channels, layers or channels having different versions may be mixed in the same processing block.

14. Update Processing for Each Processing Unit

Next, update processing for each processing unit in the application example will be described with reference to the flowchart of FIG. 18.

Figure 11:
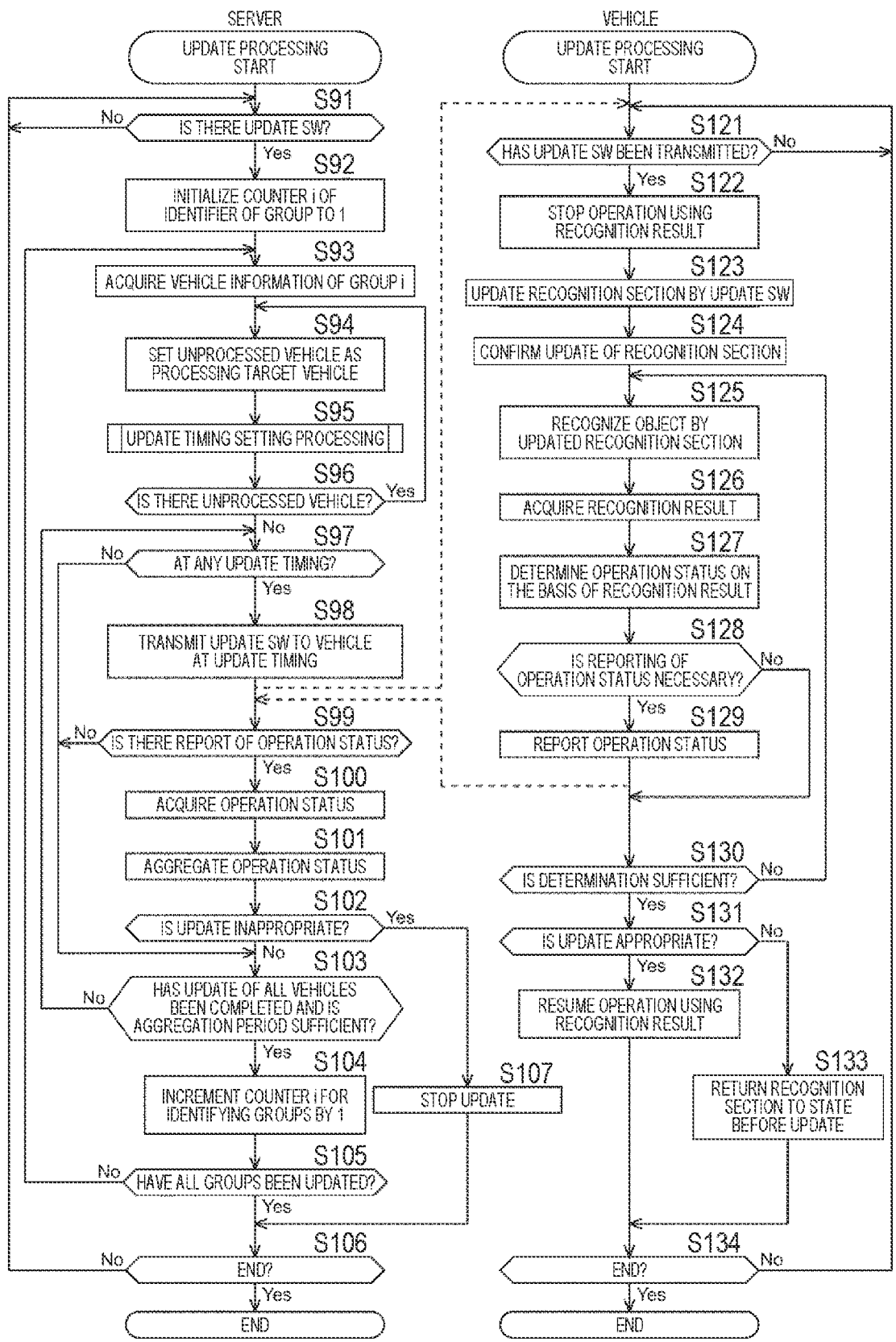
FIG. 11 is a flowchart illustrating update processing.
Figure 18:
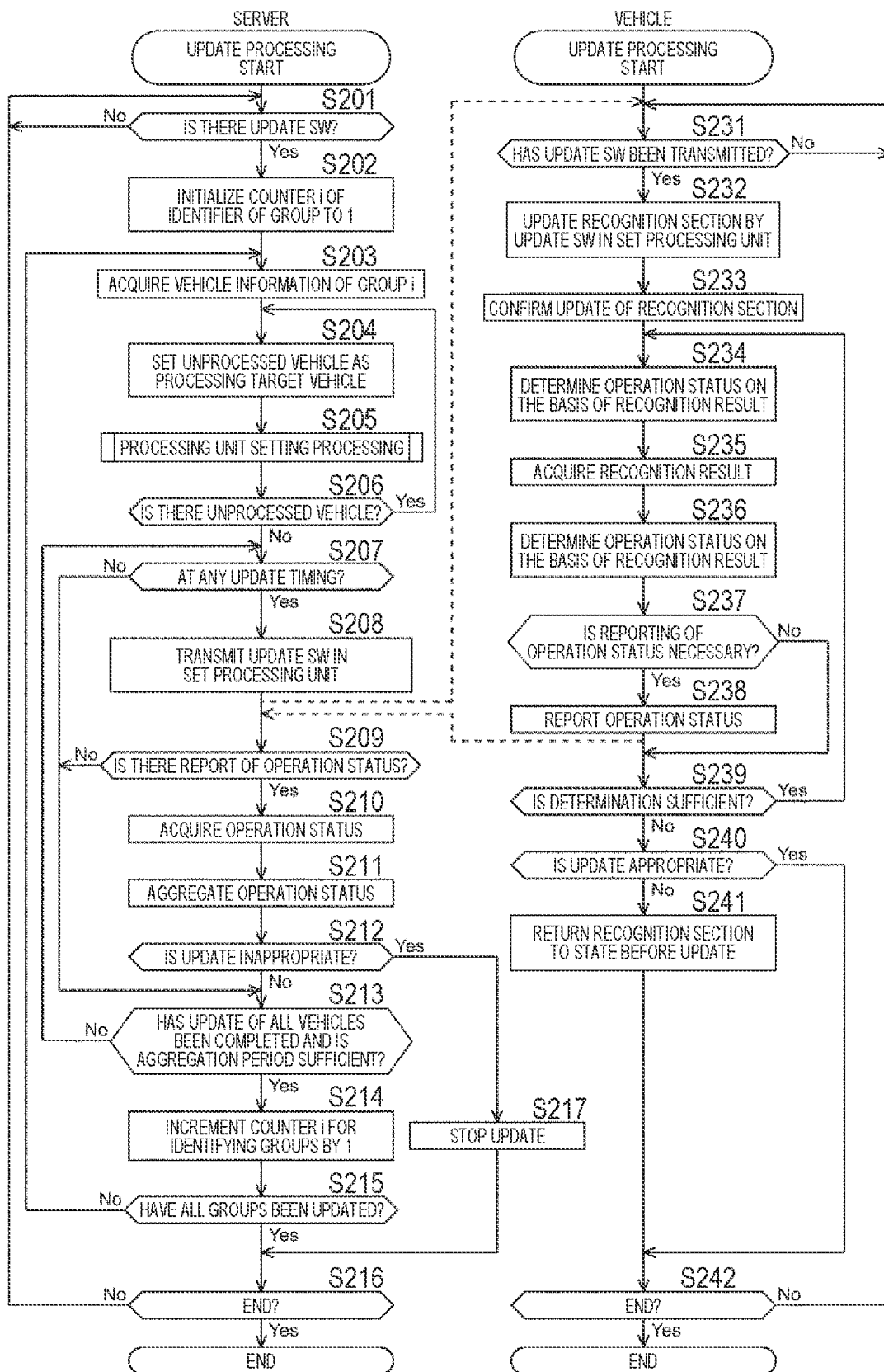
FIG. 18 is a flowchart illustrating update processing for each processing unit.

Note that the processing of steps S201 to S204, S206, S207, and S209 to S217 and steps S234 to S240 and S242 in the flowchart of FIG. 18 is similar to the processing of steps S91 to S94, S96, S97, and S99 to S107 and steps S125 to S131 and S134 in the flowchart of FIG. 11, and thus description thereof is omitted.

That is, in step S204, when an unprocessed vehicle among the vehicles 1 of the group i is set as the processing target vehicle, in step S205, the distribution planning section 235 executes the processing unit setting processing, sets the update unit for updating the recognition section 73 by the update SW of the processing target vehicle, and sets the update timing according to the update unit.

<Processing Unit Decision Processing>

Figure 19:
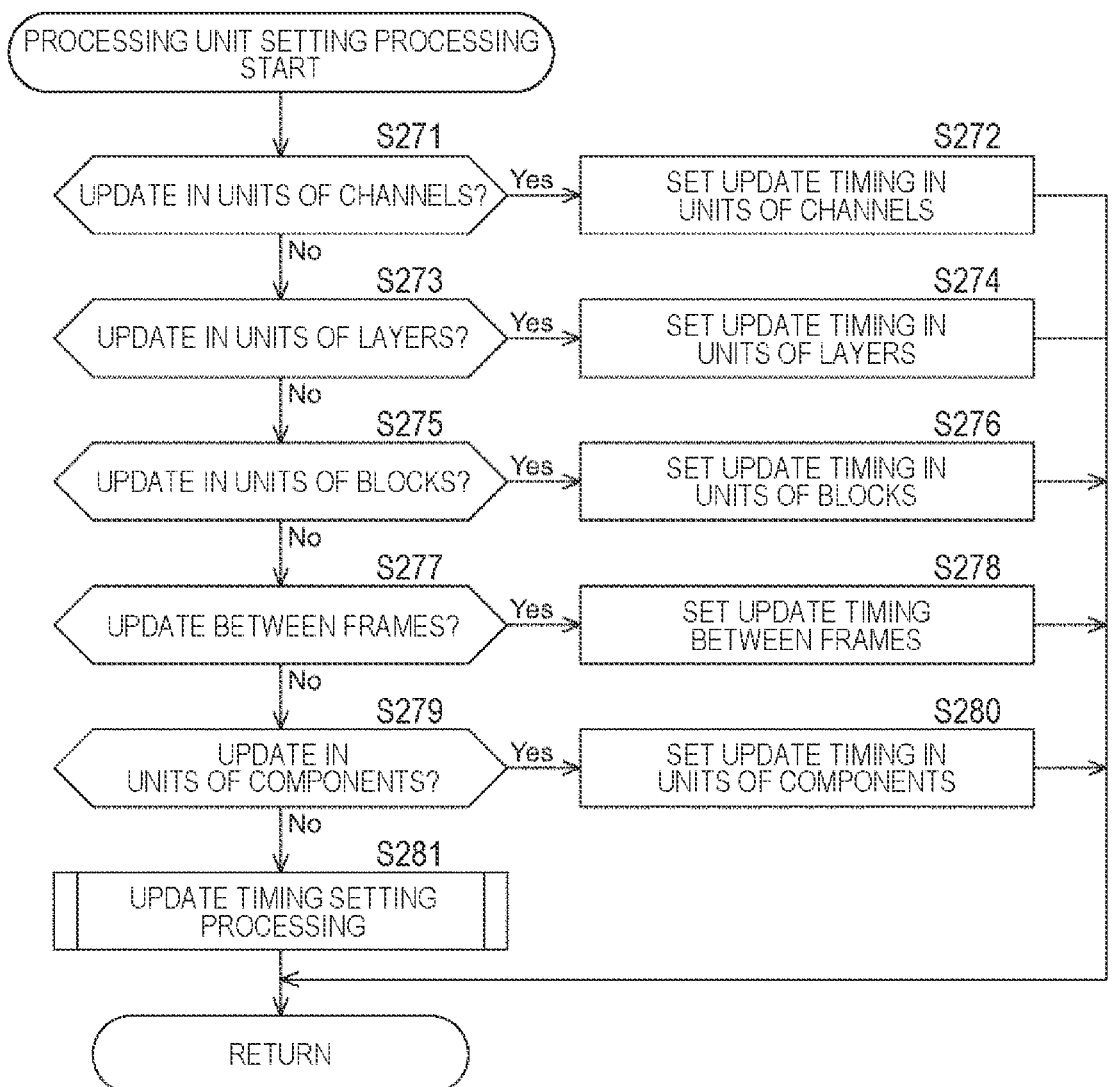
FIG. 19 is a flowchart illustrating processing unit setting processing.

Here, the processing unit decision processing will be described with reference to the flowchart of FIG. 19.

In step S271, the distribution planning section 235 determines whether or not the processing is the update processing in which the processing unit updated by the update SW is a channel unit.

In step S271, in a case where the processing is the update processing in which the processing unit updated by the update SW is a channel unit, the process proceeds to step S272.

In step S272, the distribution planning section 235 sets the update timing when the processing unit is a channel unit.

In step S271, in a case where the processing is not the update processing in which the processing unit updated by the update SW is a channel unit, the process proceeds to step S273.

In step S273, the distribution planning section 235 determines whether or not the processing is the update processing in which the processing unit updated by the update SW is a layer unit.

In step S273, in a case where the processing is the update processing in which the processing unit updated by the update SW is a layer unit, the process proceeds to step S274.

In step S274, the distribution planning section 235 sets the update timing when the processing unit is a layer unit, as described with reference to FIG. 17.

In step S273, in a case where the processing is not the update processing in which the processing unit updated by the update SW is a layer unit, the process proceeds to step S275.

In step S275, the distribution planning section 235 determines whether or not the processing is the update processing in which the processing unit updated by the update SW is a block unit.

In step S275, in a case where the processing is the update processing in which the processing unit updated by the update SW is a block unit, the process proceeds to step S276.

In step S276, the distribution planning section 235 sets the update timing when the processing unit is a block unit, as described with reference to FIG. 16.

In step S275, in a case where the processing is not the update processing in which the processing unit updated by the update SW is a block unit, the process proceeds to step S277.

In step S277, the distribution planning section 235 determines whether or not the processing is the update processing in which the processing unit updated by the update SW is between frames.

In step S277, in a case where the processing is the update processing in which the processing unit updated by the update SW is a frame unit, the process proceeds to step S278.

In step S278, the distribution planning section 235 sets the update timing when the processing unit is between frames, as described with reference to FIG. 15.

In step S277, in a case where the processing is not the update processing in which the processing unit updated by the update SW is between frames, the process proceeds to step S279.

In step S279, the distribution planning section 235 determines whether or not the processing is the update processing in which the processing unit updated by the update SW is a component unit.

In step S279, in a case where the processing is the update processing in which the processing unit updated by the update SW is a component unit, the process proceeds to step S280.

In step S280, the distribution planning section 235 sets the update timing when the processing unit is a component unit, as described with reference to FIG. 14.

In step S279, in a case where the processing is not the update processing in which the processing unit updated by the update SW is a component unit, the process proceeds to step S281.

Since the processing in step S281 is not the update in any processing unit of a channel unit, a layer unit, a block unit, between frames, and a component unit, the processing is processing assuming a state in which the recognition section 73 is stopped with the entire recognition section 73 as a unit. Therefore, the distribution planning section 235 sets the update timing by executing the update timing setting processing similar to step S99 in the flowchart of FIG. 11.

Here, the description returns to the flowchart of FIG. 18.

Then, at the timing at which the update processing by the update SW set for each processing unit is performed in step S207, the update SW for executing the update of the recognition section 73 in each processing unit is transmitted to the vehicle 1 in the processing of step S208.

When it is determined in step S231 that the update SW is transmitted, in step S232, the update section 204 controls the communication section 22 to acquire the update SW corresponding to the transmitted processing unit, and updates the recognition section 73. At this time, before performing the update by the update SW, the update section 204 holds the recognition section 73 before the update for backup.

Note that, in the update processing of FIG. 18, as in the processing of step S122 in the update processing of FIG. 11, both the operation related to the object recognition processing of the recognition section 73 and the operation control based on the recognition result of the recognition section 73 in the control section 201 are not stopped, and the operation is continued.

In step S233, the update section 204 confirms that the recognition section 73 has been reliably updated.

At this time, for example, in a case where the update processing is performed in units of components, between frames, in units of blocks, in units of layers, or in units of channels, the update section 204 may compare the recognition result of the recognition section 73 before the update with the recognition result of the recognition section 73 after the update to determine whether or not there is a change of a predetermined level or more, thereby determining whether or not the update has been appropriately performed.

Furthermore, when the operation status of the recognition section 73 after the update is recognized, the operation status is transmitted to the server 2 as necessary, and it is determined that the determination of the operation status is sufficient, the process proceeds to step S240.

In step S240, the update section 204 determines whether or not the update of the recognition section 73 by the update SW is appropriate.

In a case where it is determined in step S240 that the update of the recognition section 73 by the update SW is not appropriate, the process proceeds to step S241.

In step S241, the update section 204 returns to the operation to the state of the recognition section 73 before update held for backup, and brings the operation related to the object recognition processing of the recognition section 73 before update and the operation control based on the recognition result of the recognition section 73 before update in the control section 201 to the state before update. That is, in this case, the recognition section 73 is not updated, and the operation in the state before the update is continued.

That is, in this case, since the update by the update SW of the recognition section 73 is not appropriate, it is considered that the reliability of the recognition result of the recognition section 73 after the update is low. For this reason, if the processing based on the recognition result of the recognition section 73 after the update is performed, there is a possibility that erroneous processing based on erroneous detection is performed and dangerous operation is caused. Therefore, the operation is returned to the operation based on the recognition result of the recognition section 73 before the update.

Furthermore, in a case where it is determined that the update of the recognition section 73 by the update SW is not appropriate, instead of the processing of step S241, a state may be made in which the processing based on the recognition result of the recognition section 73 after the update by the update SW is not performed in the control section 201.

Meanwhile, in a case where it is determined in step S240 that the update of the recognition section 73 by the update SW is appropriate, the processing of step S241 is skipped.

That is, since the operation of the recognition section 73 is updated without being stopped and the update is appropriately performed, the operation is continued as it is.

With the series of processing described above, the update processing of the recognition section 73 by the update SW can be executed with the timing set for each processing unit, so that the operation of the object recognition processing in the recognition section 73 can be appropriately updated without being stopped.

Note that, in the above description, the update processing (hereinafter, also referred to as non-operation update processing) for implementing the update processing by the update SW in a state where the object recognition processing in the recognition section 73 is stopped, which has been described with reference to the flowchart of FIG. 11, and the update processing (hereinafter, also referred to as operation update processing) for implementing the update processing by the update SW in a state where the object recognition processing in the recognition section 73 is stopped, which has been described with reference to the flowchart of FIG. 18, have been described.

Regarding the non-operation update processing and the operation update processing, it is generally considered that the non-operation update processing is safer, but the operation update processing can update almost at any time. Therefore, the non-operation update processing and the operation update processing may be switched.

For example, the non-operation update processing may be performed within a predetermined period after the distribution of the update SW is started, and the operation update processing may be performed in a case where the update cannot be performed within the predetermined period.

Furthermore, for example, a score indicating urgency or priority according to the update content of the recognition section 73 by the update SW may be set, and the non-operation update processing may be performed in a case of an update with urgency or priority lower than a predetermined score, and the operation update processing may be performed in a case of an update with urgency or priority higher than a predetermined score.

Moreover, the score indicating urgency or priority may be changed according to the automated driving plan or the like. For example, the non-operation update processing may be performed by setting the score indicating urgency or priority lower for the update processing of the recognition section 73 related to the function that is not scheduled to be used in the automated driving plan, and the operation update processing may be performed by setting the score indicating urgency or priority higher for the update processing of the recognition section 73 related to the function that is scheduled to be used in the automated driving plan.

Moreover, as the plan made in the automated driving plan is changed, for example, the non-operation update processing may be performed by changing the setting so that the score indicating urgency or priority becomes lower for the update processing of the recognition section 73 related to the function that is not scheduled to be used in accordance with the change of the automated driving plan, and the operation update processing may be performed by changing the setting so that the score indicating urgency or priority becomes higher for the update processing of the recognition section 73 related to the function that is scheduled to be used in accordance with the change of the automated driving plan.

Note that, in the above, an example has been described in which the managed software program (SW) is the recognition section 73 that executes the object recognition processing and recognizes an object. However, as long as the SW is generated by machine learning or the like, the SW may execute other processing. For example, the SW may be an SW that executes a route search formed by machine learning or an SW that implements battery management.

15. Example Executed by Software

Meanwhile, the above-described series of processing can be executed by hardware, but can also be executed by software. In a case where the series of processing is executed by software, a program constituting the software is installed from a recording medium to a computer incorporated in dedicated hardware or, for example, a general-purpose computer or the like capable of executing various functions by installing various programs.

Figure 20:
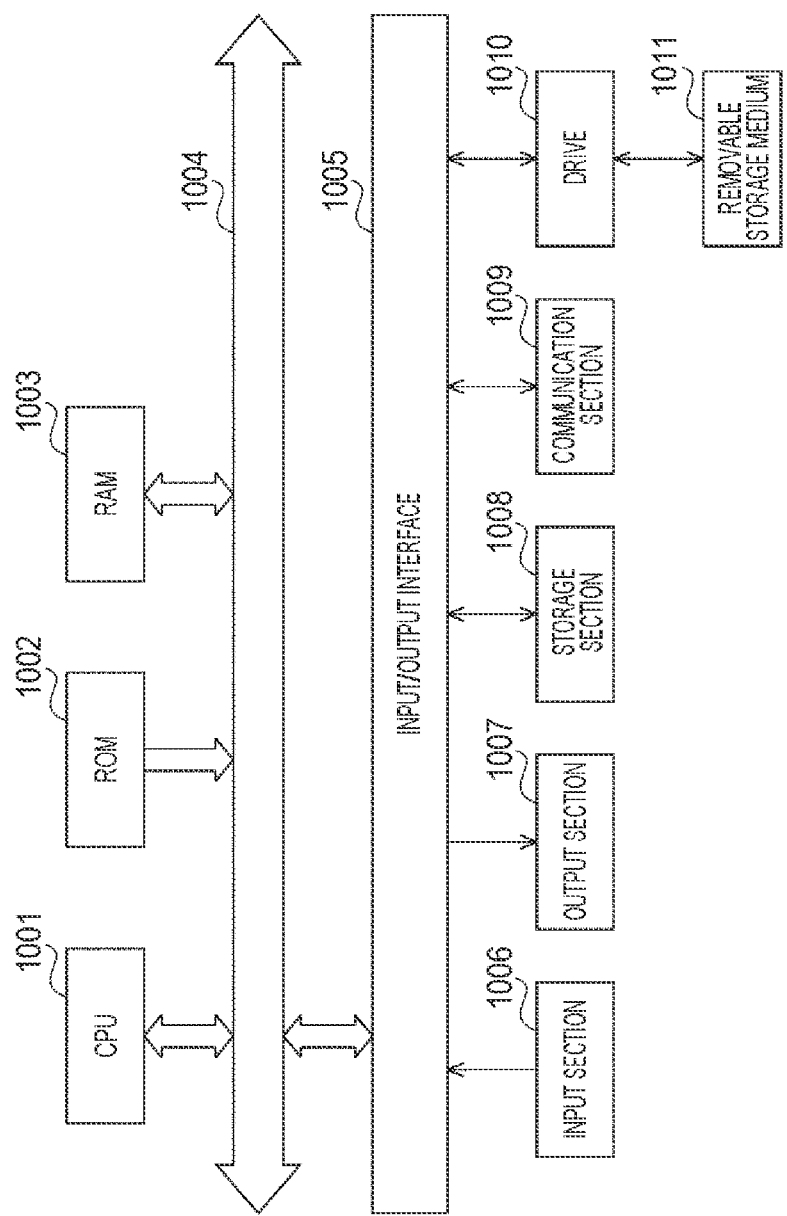
FIG. 20 is a diagram illustrating a configuration example of a general-purpose computer.

FIG. 20 illustrates a configuration example of a general-purpose computer. The personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

The input/output interface 1005 is connected with an input section 1006 including an input device such as a keyboard, a mouse, or the like with which a user inputs an operation command, an output section 1007 that outputs an image of a processing operation screen or a processing result to a display device, a storage section 1008 including a hard disk drive or the like that stores programs or various data, and a communication section 1009 including a local area network (LAN) adapter or the like that executes communication processing via a network represented by the Internet. Furthermore, a drive 1010 that reads and writes data from and to a removable storage medium 1011 such as a magnetic disk (including a flexible disk), an optical disk (including a compact disc-read only memory (CD-ROM) and a digital versatile disc (DVD)), a magneto-optical disk (including a mini disc (MD)), a semiconductor memory, or the like is connected.

The CPU 1001 executes various processes according to programs stored in the ROM 1002 or programs read from the removable storage medium 1011 such as a magnetic disk, an optical disk, a magneto-optical disk, a semiconductor memory, or the like installed in the storage section 1008, and loaded from the storage section 1008 to the RAM 1003. The RAM 1003 also appropriately stores data and the like necessary for the CPU 1001 to execute various processes.

In the computer configured as described above, for example, the CPU 1001 loads a program stored in the storage section 1008 into the RAM 1003 via the input/output interface 1005 and the bus 1004 and executes the program, whereby the above-described series of processing is performed.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage section 1008 via the input/output interface 1005 by attaching the removable storage medium 1011 to the drive 1010. Furthermore, the program can be received by the communication section 1009 via a wired or wireless transmission medium and installed in the storage section 1008. In addition, the program can be installed in the ROM 1002 or the storage section 1008 in advance.

Note that the program executed by the computer may be a program in which processing is performed in time series in the order described in the present specification, or may be a program in which processing is performed in parallel or at necessary timing such as when a call is made or the like.

Figure 5:
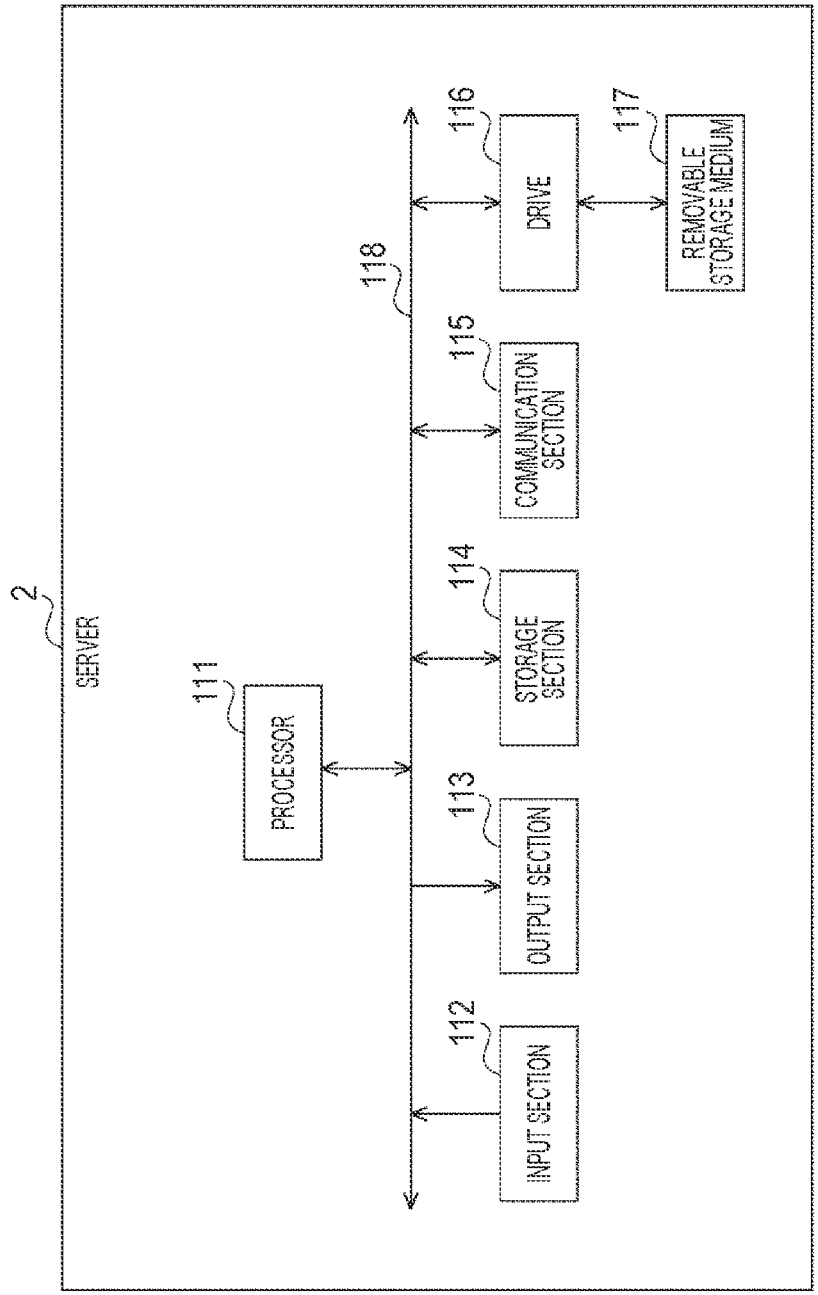
FIG. 5 is a block diagram illustrating a configuration example of a server.

Note that the CPU 1001 in FIG. 20 implements the functions of the processor 21 in FIG. 3 and the processor 111 in FIG. 5.

Furthermore, in the present specification, a system means a set of a plurality of components (devices, modules (parts), or the like), and it does not matter whether or not all the components are in the same housing. Therefore, a plurality of devices housed in separate housings and connected via a network and one device in which a plurality of modules is housed in one housing are both systems.

Note that the embodiments of the present disclosure are not limited to the above-described embodiments, and various modifications can be made without departing from the gist of the present disclosure.

For example, the present disclosure can have a configuration of cloud computing in which one function is shared and processed in cooperation by a plurality of devices via a network.

Furthermore, each step described in the above-described flowchart can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can also have the following configurations.

<1> An information processing apparatus including
 an update section that updates a software program (SW) of a moving apparatus for each processing unit constituting the SW.

<2> The information processing apparatus according to <1>,
 in which the SW is formed by machine learning, and
 the update section updates the SW using an update SW for updating the SW to the SW relearned by the machine learning.

<3> The information processing apparatus according to <2>,
 in which the SW is an SW that is formed by machine learning and functions as an object recognition section that executes object recognition processing based on an image.

<4> The information processing apparatus according to <3>,
 in which the update section updates the SW in units of components constituting the SW.

<5> The information processing apparatus according to <4>,
 in which the update section updates the SW of a component in which a predetermined object is not to be recognized by the object recognition processing among components constituting the SW.

<6> The information processing apparatus according to <3>,
 in which the update section updates the SW at a predetermined timing between frames of the image captured.

<7> The information processing apparatus according to <6>,
 in which the update section updates the SW at a timing at which the SW does not operate between frames of the image captured.

<8> The information processing apparatus according to <6>,
 in which the SW includes a plurality of processing blocks, and
 the update section updates a predetermined processing block of the SW at a timing at which the predetermined processing block does not operate between frames of the image captured.

<9> The information processing apparatus according to <8>,
 in which the processing block includes a neural network, and
 the update section updates a predetermined layer in the predetermined processing block of the SW at a timing at which the predetermined processing block does not operate between frames of the image captured.

<10> The information processing apparatus according to <9>,
in which the update section updates a predetermined channel in the predetermined layer in the predetermined processing block of the SW at a timing at which the predetermined processing block does not operate between frames of the image captured.

<11> The information processing apparatus according to <3> to <10>, further including
a control section that controls an operation on the basis of an object recognition result of the SW,
in which the control section stops control of the operation based on the object recognition result of the updated SW that functions as the object recognition section on the basis of an operation status of the SW.

<12> The information processing apparatus according to <11>,
in which the control section controls the operation on the basis of the object recognition result of the SW that functions as the object recognition section before update on the basis of the operation status of the SW.

<13> The information processing apparatus according to <11>,
in which the moving apparatus is a vehicle, and
the control section controls automated driving of the vehicle on the basis of the object recognition result of the SW that functions as the object recognition section.

<14> The information processing apparatus according to <13>,
in which the update section acquires the update SW for updating the SW distributed from a server, and updates the SW on the basis of the update SW.

<15> The information processing apparatus according to <14>,
in which the server groups the information processing apparatus that distribute the update SW on the basis of safety related to control of the automated driving of the vehicle based on the object recognition result of the SW in a case where the SW is not appropriately updated by the update SW, and sequentially and stepwise distributes the update SW in units of groups from the information processing apparatuses of a safest group.

<16> The information processing apparatus according to <15>,
in which the server generates a distribution plan that is a timing of distributing the update SW to the information processing apparatus in units of groups grouped on the basis of the safety.

<17> The information processing apparatus according to <14>,
in which the server distributes the update SW for updating the SW to the relearned state when the SW relearned reaches predetermined recognition accuracy on the basis of the image and the corresponding object recognition result.

<18> An information processing method including the step of
updating a software program (SW) of a moving apparatus for each processing unit constituting the SW.

<19> A program for causing a computer to function as
an update section that updates a software program (SW) of a moving apparatus for each processing unit constituting the SW.

<20> An information processing system including
an update section that updates a software program (SW) of a moving apparatus for each processing unit constituting the SW.

REFERENCE SIGNS LIST

1 Vehicle
2 Server
21 Processor
22 Communication section
23 Map information accumulation section
24 GNSS reception section
25 External recognition sensor
32 Vehicle control section
51 Camera
73 Recognition section
201 Control section
202 Operation status recognition section
203 Operation status reporting section
204 Update section
231 Vehicle information collection section
232 Grouping section
233 Distribution order decision section
234 Distribution status confirmation section
235 Distribution planning section
236 Distribution section
237 Relearning section
238 Update SW release section

The invention claimed is:

1. An information processing apparatus, comprising:
a central processing unit (CPU) configured to:
recognize a first object based on a specific image, wherein each of the first object and the specific image is associated with a moving apparatus;
control an automated driving of the moving apparatus based on the recognized first object;
acquire an update software program (SW) from a server;
update, based on the update SW, a first SW for each of a plurality of components in time-series, wherein
the first SW is associated with the moving apparatus,
the plurality of components includes the first SW,
the server classifies a plurality of information processing apparatuses into groups based on a safety of the moving apparatus and the control of the automated driving of the moving apparatus, and
the plurality of information processing apparatuses includes the information processing apparatus; and
update a first component of the plurality of components at a first timing based on an operation on the moving apparatus, wherein
the first component includes the first SW, and
the first timing is a timing at which the first component is not executed.

2. The information processing apparatus according to claim 1, wherein
the first SW is based on machine learning,
the CPU is further configured to update the first SW to a second SW based on the update SW, and
the second SW corresponds to the first SW relearned by the machine learning.

3. The information processing apparatus according to claim 2, wherein the CPU is further configured to recognize the first object based on the second SW and the specific image.

4. The information processing apparatus according to claim 3, wherein
the CPU is further configured to update a third SW associated with a second component of the plurality of components, the second component includes the third SW, and
the second component is associated with a second object that is not to be recognized.

5. The information processing apparatus according to claim 3, wherein
the CPU is further configured to update the first SW at a second timing, and
the second timing is between frames of the specific image.

6. The information processing apparatus according to claim 5, wherein the CPU is further configured to update the first SW at a third timing at which the first component does not operate between the frames of the specific image.

7. The information processing apparatus according to claim 5, wherein
the first SW includes a plurality of processing blocks,
the CPU is further configured to update a specific processing block of the plurality of processing blocks at a third timing, and
the specific processing block does not operate between the frames of the specific image at the third timing.

8. The information processing apparatus according to claim 7, wherein
the specific processing block includes a neural network, and
the CPU is further configured to update a specific layer in the specific processing block at the third timing.

9. The information processing apparatus according to claim 8, wherein the CPU is further configured to update a specific channel in the specific layer at the third timing.

10. The information processing apparatus according to claim 3, wherein the CPU is further configured to:
control the operation based on the recognized first object;
determine, based on the specific image, an operation status associated with the recognized first object;
stop the control of the operation based on the recognized first object associated with the updated first SW; and
recognize the first object based on the operation status of the first SW.

11. The information processing apparatus according to claim 10, wherein the CPU is further configured to:
control the operation based on the recognized first object associated with the first SW; and
recognize the first object before the determination of the operation status.

12. The information processing apparatus according to claim 10, wherein the moving apparatus is a vehicle.

13. The information processing apparatus according to claim 12, wherein
the control of the automated driving of the vehicle is based on the first SW not appropriately updated by the update SW, and
the update SW is sequentially and stepwise distributed to a safest group of the groups.

14. The information processing apparatus according to claim 13, wherein
the safest group comprises a set of information processing apparatuses of the plurality of information processing apparatuses,
the update SW is distributed based on a distribution plan,
the distribution plan is associated with a second timing, and
the second timing is associated with the distribution of the update SW to the set of information processing apparatuses.

15. The information processing apparatus according to claim 1, wherein the update SW is distributed based on a specific recognition accuracy associated with the first SW, and
the specific recognition accuracy is based on the specific image and the recognized first object.

16. An information processing method, comprising:
recognizing an object based on a specific image, wherein each of the object and the specific image is associated with a moving apparatus;
controlling an automated driving of the moving apparatus based on the recognized object;
acquiring an update software program (SW) from a server;
updating, based on the update SW, a specific SW for each of a plurality of components in time-series, wherein
the specific SW is associated with the moving apparatus,
the plurality of components includes the specific SW, and
the server classifies a plurality of information processing apparatuses into groups based on a safety of the moving apparatus and the control of the automated driving of the moving apparatus; and
updating a specific component of the plurality of components at a specific timing based on an operation on the moving apparatus, wherein
the specific component includes the specific SW, and
the specific timing is a timing at which the specific component is not executed.

17. A non-transitory computer-readable medium having stored thereon, computer-executable instructions which, when executed by a computer, cause the computer to execute operations, the operations:
recognizing an object based on a specific image, wherein each of the object and the specific image is associated with a moving apparatus;
controlling an automated driving of the moving apparatus based on the recognized object;
acquiring an update software program (SW) from a server;
updating, based on the update SW, a specific SW for each of a plurality of components in time-series, wherein
the specific SW is associated with the moving apparatus,
the plurality of components includes the specific SW, and
the server classifies a plurality of information processing apparatuses into groups based on a safety of the moving apparatus and the control of the automated driving of the moving apparatus; and
updating a specific component of the plurality of components at a specific timing based on an operation on the moving apparatus, wherein
the specific component includes the specific SW, and
the specific timing is a timing at which the specific component is not executed.

18. An information processing system, comprising
a server; and
an information processing apparatus that includes a central processing unit (CPU), wherein the CPU is configured to:
recognize an object based on a specific image, wherein each of the object and the specific image is associated with a moving apparatus;
control an automated driving of the moving apparatus based on the recognized object;
acquire an update software program (SW) from the server;

update, based on the update SW, a specific SW for each of a plurality of components in time-series, wherein
the specific SW is associated with the moving apparatus, and
the plurality of components includes the specific SW; and
update a specific component of the plurality of components at a specific timing based on an operation on the moving apparatus, wherein
the specific component includes the specific SW,
the specific timing is a timing at which the specific component is not executed,
the server is configured to classify a plurality of information processing apparatuses into groups based on a safety of the moving apparatus and the control of the automated driving of the moving apparatus, and
the plurality of information processing apparatuses includes the information processing apparatus.

19. The information processing apparatus according to claim 1, wherein
the control of the automated driving of the moving apparatus is based on the first SW not appropriately updated by the update SW, and
the update SW is sequentially and stepwise distributed to a safest group of the groups.

20. The information processing apparatus according to claim 19, wherein
the safest group comprises a set of information processing apparatuses of the plurality of information processing apparatuses,
the update SW is distributed based on a distribution plan,
the distribution plan is associated with a second timing, and
the second timing is associated with the distribution of the update SW to the set of information processing apparatuses.

* * * * *